(12) United States Patent
Matthieu et al.

(10) Patent No.: US 9,755,894 B2
(45) Date of Patent: *Sep. 5, 2017

(54) VIRTUAL SERIAL CABLE

(71) Applicant: Citrix Systems, Inc., Fort Lauderdale, FL (US)

(72) Inventors: Chris Matthieu, Tempe, AZ (US); Geir Ramleth, Palo Alto, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 401 days.

This patent is subject to a terminal disclaimer.

(21) Appl. No.: 14/497,193

(22) Filed: Sep. 25, 2014

(65) Prior Publication Data
US 2016/0072670 A1   Mar. 10, 2016

Related U.S. Application Data

(63) Continuation-in-part of application No. 14/482,963, filed on Sep. 10, 2014, now Pat. No. 9,009,230.

(51) Int. Cl.
*G06F 15/16* (2006.01)
*H04L 12/24* (2006.01)
(Continued)

(52) U.S. Cl.
CPC .......... *H04L 41/0806* (2013.01); *H04L 67/12* (2013.01); *H04L 67/141* (2013.01); *H04L 69/08* (2013.01)

(58) Field of Classification Search
CPC ............................. H04L 67/141; H04L 67/12
See application file for complete search history.

(56) References Cited

U.S. PATENT DOCUMENTS

| 2010/0099432 A1* | 4/2010 | Glover | H04W 4/00 455/456.1 |
|---|---|---|---|
| 2012/0072533 A1 | 3/2012 | O'Neil | |
| 2014/0258363 A1 | 9/2014 | Peco et al. | |

OTHER PUBLICATIONS

First Action Interview Pilot Program Pre-Interview Communication issued Nov. 26, 2014 in U.S. Appl. No. 14/482,963.
(Continued)

*Primary Examiner* — Hua Fan
(74) *Attorney, Agent, or Firm* — Kilpatrick Townsend & Stockton LLP

(57) ABSTRACT

Techniques and systems for providing a virtual serial cable are provided. A network server, a method, and a computer-program product may be provided. A network server may receive a serial communication from a first serially-connected device in a first location, wherein the first serially-connected device is assigned a first universally unique identifier (UUID), and wherein the serial communication includes a second (UUID) assigned to a second serially-connected device in a second location. A non-transitory computer-readable storage medium may contain instructions, when executed, cause one or more processors to obtain the (UUID), determine that the second (UUID) is assigned to the second serially-connected device, and create a virtual serial connection between the first and second serially-connected devices. The network server may transmit the serial communication to the second serially-connected device located in the second location. The serial communication causes the second serially-connected device to perform an operation.

14 Claims, 10 Drawing Sheets

(51) Int. Cl.
*H04L 29/08* (2006.01)
*H04L 29/06* (2006.01)

(56) References Cited

OTHER PUBLICATIONS

Notice of Allowance issued in U.S. Appl. No. 14/482,963 on Feb. 6, 2015.

\* cited by examiner

500

502 RECEIVE A COMMUNICATION FROM A FIRST IoT DEVICE, WHEREIN THE FIRST IoT DEVICE IS COMMUNICATIVELY CONNECTED TO THE COMPUTING DEVICE USING A FIRST CONNECTION PROTOCOL, AND WHEREIN THE COMMUNICATION IS RECEIVED USING THE FIRST CONNECTION PROTOCOL.

504 DETERMINE A SECOND IoT DEVICE TO WHICH THE COMMUNICATION IS INTENDED TO BE TRANSMITTED

506 DETERMINE A SECOND CONNECTION PROTOCOL USED BY THE SECOND IoT DEVICE

508 TRANSLATE THE COMMUNICATION TO THE SECOND CONNECTION PROTOCOL, WHEREIN THE FIRST CONNECTION PROTOCOL IS DIFFERENT THAN THE SECOND CONNECTION PROTOCOL.

510 TRANSMIT THE COMMUNICATION TO THE SECOND IoT DEVICE, WHEREIN THE SECOND IoT DEVICE IS COMMUNICATIVELY CONNECTED TO THE COMPUTING DEVICE USING THE SECOND CONNECTION PROTOCOL, AND WHEREIN THE COMMUNICATION IS TRANSMITTED USING THE SECOND CONNECTION PROTOCOL

RECEIVE A SERIAL COMMUNICATION FROM A FIRST SERIALLY-CONNECTED DEVICE LOCATED IN A FIRST LOCATION, WHEREIN THE FIRST SERIALLY-CONNECTED DEVICE IS ASSIGNED A FIRST UNIVERSALLY UNIQUE IDENTIFIER, AND WHEREIN THE SERIAL COMMUNICATION INCLUDES A SECOND UNIVERSALLY UNIQUE IDENTIFIER ASSIGNED TO A SECOND SERIALLY-CONNECTED DEVICE LOCATED IN A SECOND LOCATION
702

↓

OBTAIN THE SECOND UNIVERSALLY UNIQUE IDENTIFIER
704

↓

DETERMINE THAT THE SECOND UNIVERSALLY UNIQUE IDENTIFIER IS ASSIGNED TO THE SECOND SERIALLY-CONNECTED DEVICE
706

↓

CREATE A VIRTUAL SERIAL CONNECTION BETWEEN THE FIRST SERIALLY-CONNECTED DEVICE AND THE SECOND SERIALLY-CONNECTED DEVICE
708

↓

TRANSMIT THE SERIAL COMMUNICATION TO THE SECOND SERIALLY-CONNECTED DEVICE LOCATED IN THE SECOND LOCATION
710

RECEIVE A COMMUNICATION FROM A FIRST PROPRIETARY APPLICATION PROGRAMMING INTERFACE OF A FIRST IoT DEVICE, WHEREIN THE COMMUNICATION INCLUDES A COMMAND FOR A SECOND IoT DEVICE TO PERFORM, AND WHEREIN THE SECOND IoT DEVICE USES A SECOND PROPRIETARY APPLICATION PROGRAMMING INTERFACE
902

CONVERT THE COMMAND FROM A PROTOCOL CORRESPONDING TO THE FIRST PROPRIETARY APPLICATION PROGRAMMING INTERFACE TO A UNIVERSAL PROTOCOL CORRESPONDING TO THE UNIVERSAL APPLICATION PROGRAMMING INTERFACE
904

CAUSE A TRANSMITTER TO TRANSMIT THE COMMUNICATION INCLUDING THE CONVERTED COMMAND TO THE UNIVERSAL APPLICATION PROGRAMMING INTERFACE
906

FIG. 9

VIRTUAL SERIAL CABLE

CROSS-REFERENCE TO RELATED APPLICATIONS

This application is a continuation-in-part of co-pending U.S. patent application Ser. No. 14/482,963, entitled "Machine-to-Machine Instant Messaging," filed Sep. 10, 2014, which is hereby expressly incorporated by reference herein.

BACKGROUND OF THE INVENTION

Networks provide the ability for network connectable devices to communicate with one another. For example, Internet of Things (IoT) systems allow communication among various IoT devices and/or other devices. Many IoT systems provide a limited selection of devices that can interface with one another, such as devices that share a common source and/or manufacturer, devices that operate using a common proprietary connection protocol or interface, devices that have built-in communications capabilities, or the like. Typically, IoT systems enable only simple interactions between devices, oftentimes allowing only a single layer of processing and/or communication. IoT systems that may enable more complex interactions between devices tend to only allow devices to communicate with other devices that share a common proprietary connection protocol or interface.

BRIEF SUMMARY OF THE INVENTION

Techniques and systems are described for providing a common messaging system or interface that allows various devices to exchange machine-to-machine instant messages in real-time or near real-time. For example, the common messaging system may be implemented by one or more network servers and may allow a device to exchange communications or messages with another device regardless of whether the devices are built by different manufacturers, operate using different connection protocols or interfaces, or whether the devices are built with the ability to communicate with a network. In some examples, the common messaging system may operate using multiple connection protocols that may be used by different devices. The multiple connection protocols may be referred to herein as native connection protocols of the common messaging system. In some examples, the common messaging system may include a universal application programming interface that is available for use by all of the native protocols. The common messaging system can route messages to and from any connected device in any supported protocol (whether native or transformed by a plug-in, as described below). The common messaging system may translate between the different native protocols to facilitate message exchanges between devices that operate using different ones of the native connection protocols. For example, the common messaging system may translate a received communication that is in a first native connection protocol to a second native connection protocol before sending the communication to a device that only operates using the second native connection protocol.

In some examples, the common messaging system may interact with a universal interface that is built into a device. The built-in universal interface allows the device to perform operations that native firmware of the device does not allow it to perform. In some embodiments, the built-in universal interface may include an operating system that allows the device to communicate with the common messaging system. For example, the universal interface may override the native firmware of the device to allow the device to perform various operations.

In some examples, devices may communicate with the common messaging system using a messaging system gateway that is connected to a same local area network or personal area network as the devices. For example, the messaging system gateway may be located within a user's home, and multiple devices within the user's home may connect to the messaging system gateway using one or more connection protocols. The messaging system gateway may operate as an intermediary between the common messaging system and the devices on the local area network or personal area network, communicating with the common messaging system for each of the devices, and communicating with the devices for the common messaging system. In some embodiments, the messaging system gateway may include one or more messaging system plug-ins. In some examples, a messaging system plug-in may translate or convert one or more non-native connection protocols to a native connection protocol of the common messaging system. In some examples, a messaging system plug-in may also translate or map one or more proprietary application programming interfaces of devices to the universal application programming interface of the common messaging system. In some cases, one or more of the devices themselves may include a messaging system plug-in.

In some examples, devices may communicate with the common messaging system using a mobile messaging system gateway that is installed on a mobile device. For example, the mobile messaging system gateway may be installed on a user's mobile device. One or more devices within proximity to the mobile device may communicate with the mobile messaging system gateway using one or more connection protocols. Like the messaging system gateway, the mobile messaging system gateway may operate as an intermediary between the common messaging system and the devices. The mobile messaging system gateway may include one or more messaging system plug-ins.

Devices may be assigned a unique identifier and a token. In some embodiments, one or more components or programs of a device may also be assigned a unique identifier (e.g., a universally unique identifier (UUID)) and a token. In some cases, the unique identifier and/or token for the components of a device may be the same as the unique identifier and/or token of the device itself. In some embodiments, components of a device that may be assigned a unique identifier may include a sensor (e.g., a camera, motion sensor, temperature sensor, accelerometer, gyroscope, or any other available sensor), an output (e.g., a microphone, siren, display, light, tactile output, or any other available output), a third-party messaging service that the device is able to run, or any other component of a device that can be identified, accessed, and/or controlled. Using the common messaging system, the universal interface, and/or the messaging system gateway, devices that have assigned unique identifiers can query a vast network of devices for one or more devices that meet specific search criteria and can message or otherwise communicate with the devices.

In some embodiments, multiple cloud servers with instances of a common messaging system may be created with multiple servers or other systems each operating an instance of software that includes a common messaging system. In some embodiments, a particular instance of messaging system may have its own unique identifier that allows the instance of messaging system to connect to another instance of messaging system, thus forming a mesh network of messaging systems. Other networks and devices or machines may also be part of the mesh network, such as local area networks and personal area networks and the devices or machines that are interconnected using the local area networks and personal area networks. Each of the local area networks and personal area networks can have their own unique identifier and/or token, allowing the networks to be addressable using their unique identifier and also allowing them to address other unique identifiers around the world. Such a mesh network may allow messages and other payloads to be routed between devices and systems across cloud networks with instances of common messaging systems. Each person, device or machine, system, or components thereof can be referenced by a common messaging system using its unique identifier. Each of the unique identifiers can discover other unique identifiers (e.g., clouds, other networks, people, or devices or machines) using one or more queries, and the common messaging system, universal interface, messaging system gateway, and/or mobile messaging system gateway can enable messages to be exchanged between unique identifiers.

In some embodiments, the common messaging system may also allow a device built without the ability to communicate with a network to connect to other devices that are located remotely from the device. For example, the common messaging system may allow serially-connected devices that are located remote from one another to communicate. The serially-connected devices may not be configured to communicate directly with the common messaging system. For example, the serially-connected devices may not be equipped with a wireless transceiver or with a wired port that allows the devices to communicate with a network. The serially-connected devices may serially connect to another device that can connect with the messaging system (e.g., a personal computer, a lap top, a tablet, a serial phone line, or the like). For example, the common messaging system may bind sessions of first and second serially-connected devices together to create a virtual serial cable connection that extends to two remote locations of the first and second serially-connected devices. Each of the serially-connected devices may be assigned a unique identifier and token. The messaging system may convert the serial input communication from the first serially-connected device to a communication in the native protocol of the messaging system, and may process the input using the universal application programming interface. The messaging system may convert the communication back to serial on the output before sending the communication to the second serially-connected device. Accordingly, a first serially-connected device can communicate with another serially-connected device over the cloud network of the common messaging system by sending serial communications to the messaging system.

According to at least one example, a computing device for interfacing Internet Things (IoT) devices using different connection protocols may be provided. The computing device includes one or more data processors, and a receiver for receiving a communication from a first IoT device, wherein the first IoT device is communicatively connected to the computing device using a first connection protocol, and wherein the communication is received using the first connection protocol. The computing device further includes a non-transitory machine-readable storage medium containing instructions which when executed on the one or more data processors, cause the one or more processors to perform operations including determining a second IoT device to which the communication is intended to be transmitted, determining a second connection protocol used by the second IoT device, and translating the communication to the second connection protocol, wherein the first connection protocol is different than the second connection protocol. The computing device further includes a transmitter for transmitting the communication to the second IoT device, wherein the second IoT device is communicatively connected to the computing device using the second connection protocol, and wherein the communication is transmitted using the second connection protocol.

In some embodiments, a computer-implemented method of interfacing Internet Things (IoT) devices using different connection protocols may be provided that includes receiving, on a computing device, a communication from a first IoT device, wherein the first IoT device is communicatively connected to the computing device using a first connection protocol, and wherein the communication is received using the first connection protocol. The method further includes determining a second IoT device to which the communication is intended to be transmitted, determining a second connection protocol used by the second IoT device, and translating the communication to the second connection protocol, wherein the first connection protocol is different than the second connection protocol. The method further includes transmitting the communication to the second IoT device, wherein the second IoT device is communicatively connected to the computing device using the second connection protocol, and wherein the communication is transmitted using the second connection protocol.

In some embodiments, a computer-program product tangibly embodied in a non-transitory machine-readable storage medium of a first network device may be provided. The computer-program product includes instructions configured to cause one or more data processors to: receive a communication from a first IoT device, wherein the first IoT device is communicatively connected to the computing device using a first connection protocol, and wherein the communication is received using the first connection protocol; determine a second IoT device to which the communication is intended to be transmitted; determine a second connection protocol used by the second IoT device; translate the communication to the second connection protocol, wherein the first connection protocol is different than the second connection protocol; and transmit the communication to the second IoT device, wherein the second IoT device is communicatively connected to the computing device using the second connection protocol, and wherein the communication is transmitted using the second connection protocol.

In some embodiments, the computing device, method, and computer-program product for interfacing Internet Things (IoT) devices using different connection protocols described above may further include wherein the first IoT device is assigned a first universally unique identifier, and wherein the second IoT device is assigned a second universally unique identifier. In some embodiments, the received communication includes the second universally unique identifier, and the second IoT device and the second connection protocol used by the second IoT device are determined based on the second universally unique identifier. In some embodiments, the first IoT device is not configured to communicate using the second connection protocol, and the second IoT device is not configured to communicate using the first connection protocol. In some embodiments, the first connection protocol and the second connection protocol include machine-to-machine connection protocols.

In some embodiments, the receiver is configured to and may receive a response to the communication from the second IoT device, wherein the response is received using the second connection protocol. In some embodiments, the non-transitory computer-readable storage medium may contain instructions which when executed on the one or more data processors, cause the one or more processors to translate the response to the first connection protocol. In some embodiments, the transmitter is configured to and may transmit the response to the first IoT device, wherein the response is transmitted using the first connection protocol.

In some embodiments, the receiver is configured to and may receive a second communication from a third-party messaging account, and the transmitter is configured to transmit the second communication to the second IoT device, wherein the second communication controls a function of the second IoT device. In some embodiments, the second communication includes a message and a tag, the tag identifying a destination program of the second IoT device.

According to at least one example, a computing device may be provided that includes a universal interface for enabling one or more sensors of a first device to communicate with one or more sensors of a second device by connecting the one or more sensors with a network server of a messaging system. The universal interface is configured to and may obtain sensor data from a sensor of the first device. The universal interface is configured to and may cause a transmitter to transmit the sensor data to the network server of the messaging system, wherein a proprietary protocol of the first device does not allow the one or more sensors of the first device to communicate with other devices. The universal interface is further configured to and may receive a command from the messaging system, wherein the command is received when a sensor of the second device senses a condition, and wherein the command causes the sensor of the first device to perform a function.

In some embodiments, a computer-implemented method that includes obtaining, by a computing device, sensor data from a sensor of a first device, wherein the computing device includes a universal interface for enabling one or more sensors of the first device to communicate with one or more sensors of a second device by connecting the one or more sensors with a network server of a messaging system. The method further includes causing a transmitter to transmit the sensor data to the network server of the messaging system, wherein a proprietary protocol of the first device does not allow the one or more sensors of the first device to communicate with other devices. The method further includes receiving a command from the messaging system, wherein the command is received when a sensor of the second device senses a condition, and wherein the command causes the sensor of the first device to perform a function.

In some embodiments, a computer-program product tangibly embodied in a non-transitory machine-readable storage medium of a first network device may be provided. The computer-program product includes instructions configured to cause one or more data processors to: obtain sensor data from a sensor of a first device, wherein the computing device includes a universal interface for enabling one or more sensors of the first device to communicate with one or more sensors of a second device by connecting the one or more sensors with a network server of a messaging system; cause a transmitter to transmit the sensor data to the network server of the messaging system, wherein a proprietary protocol of the first device does not allow the one or more sensors of the first device to communicate with other devices; and receive a command from the messaging system, wherein the command is received when a sensor of the second device senses a condition, and wherein the command causes the sensor of the first device to perform a function.

In some embodiments, the computing device, method, and computer-program product including the universal interface described above may further include wherein the computing device is built into the first device to allow the first device to communicate with other devices. In some embodiments, the universal interface is configured to and may determine a first universally unique identifier assigned to the sensor of the first device, determine a second universally unique identifier assigned to a sensor of the second device, and cause the transmitter to transmit the first universally unique identifier and the second universally unique identifier with the sensor data to the network server. In some embodiments, the sensor data is transmitted to a cloud network that includes the network server. In some embodiments, the sensor data is transmitted to a local network messaging system gateway that includes the network server, and wherein the local network messaging system gateway and the computing device are connected to a local area network.

According to at least one example, a computing device for binding remote serially-connected devices may be provided. The computing device includes one or more data processors, and a receiver for receiving a serial communication from a first serially-connected device located in a first location, wherein the first serially-connected device is assigned a first universally unique identifier, and wherein the serial communication includes a second universally unique identifier assigned to a second serially-connected device located in a second location. The computing device further includes a non-transitory machine-readable storage medium containing instructions which when executed on the one or more data processors, cause the one or more processors to perform operations including obtaining the second universally unique identifier, determining that the second universally unique identifier is assigned to the second serially-connected device, and creating a virtual serial connection between the first serially-connected device and the second serially-connected device, wherein the virtual serial connection is established with the second serially-connected device based on the second universally unique identifier being assigned to the second serially-connected device. The computing device further includes a transmitter for transmitting the serial communication to the second serially-connected device located in the second location, wherein the serial communication causes the second serially-connected device to perform an operation.

In some embodiments, a computer-implemented method of binding remote serially-connected devices may be provided. The method includes receiving, by a computing device, a serial communication from a first serially-connected device located in a first location, wherein the first serially-connected device is assigned a first universally unique identifier, and wherein the serial communication includes a second universally unique identifier assigned to a second serially-connected device located in a second location. The method further includes obtaining the second universally unique identifier, determining that the second universally unique identifier is assigned to the second serially-connected device, and creating a virtual serial connection between the first serially-connected device and the second serially-connected device, wherein the virtual serial connection is established with the second serially-connected device based on the second universally unique identifier being assigned to the second serially-connected device. The method further includes transmitting the serial communication to the second serially-connected device located in the second location, wherein the serial communication causes the second serially-connected device to perform an operation.

In some embodiments, a computer-program product tangibly embodied in a non-transitory machine-readable storage medium of a first network device may be provided. The computer-program product may include instructions configured to cause one or more data processors to: receive a serial communication from a first serially-connected device located in a first location, wherein the first serially-connected device is assigned a first universally unique identifier, and wherein the serial communication includes a second universally unique identifier assigned to a second serially-connected device located in a second location; obtain the second universally unique identifier; determine that the second universally unique identifier is assigned to the second serially-connected device; create a virtual serial connection between the first serially-connected device and the second serially-connected device, wherein the virtual serial connection is established with the second serially-connected device based on the second universally unique identifier being assigned to the second serially-connected device; and transmit the serial communication to the second serially-connected device located in the second location, wherein the serial communication causes the second serially-connected device to perform an operation.

In some embodiments, the computing device, method, and computer-program product for binding remote serially-connected devices described above may further include converting the received serial communication to a communication in a native protocol of the network server, processing the communication using an application programming interface, and converting the communication back to a serial format before transmitting the communication to the second serially-connected device.

In some embodiments, the first serially-connected device and the second serially-connected device are not configured to communicate with the network server, wherein the first serially-connected device is serially connected to a first device that enables communication with the network server, and wherein the second serially-connected device is serially connected to a second device that enables communication with the network server.

In some embodiments, creating the virtual serial connection includes binding communications of the first and second serially-connected devices to the other of the first and second serially-connected devices such that all communications communicated from the first serially-connected device are transmitted to the second serially-connected device, and such that all communications communicated from the second serially-connected device are transmitted to the first serially-connected device, until the virtual serial connection is released. In some embodiments, when the virtual serial connection is created between the first serially-connected device and the second serially-connected device, communications communicated from the first serially-connected device are automatically transmitted to the second serially-connected device without user input.

According to at least one example, a computing device with a universal application programming interface for interfacing Internet Things (IoT) devices using different proprietary application programming interfaces may be provided. The computing device includes one or more data processors, and a receiver for receiving a communication originating from a first IoT device, wherein the first IoT device uses a first proprietary application programming interface, wherein the communication includes a command for a second IoT device to perform, and wherein the command is converted from a protocol corresponding to the first proprietary application programming interface to a universal protocol corresponding to the universal application programming interface. The computing device further includes a non-transitory machine-readable storage medium containing instructions which when executed on the one or more data processors, cause the one or more processors to perform operations including determining that the communication is to be transmitted to the second IoT device and causing a transmitter to transmit the communication to the second IoT device, wherein the second IoT device uses a second proprietary application programming interface, wherein the communication includes the command, and wherein the command is converted from the universal protocol corresponding to the universal application programming interface to a protocol corresponding to the second proprietary application programming interface.

In some embodiments, a computer-implemented method of using a universal application programming interface for interfacing Internet Things (IoT) devices using different proprietary application programming interfaces may be provided. The method includes receiving, at a computing device, a communication originating from a first IoT device, wherein the first IoT device uses a first proprietary application programming interface, wherein the communication includes a command for a second IoT device to perform, and wherein the command is converted from a protocol corresponding to the first proprietary application programming interface to a universal protocol corresponding to the universal application programming interface. The method further includes determining that the communication is to be transmitted to the second IoT device. The method further includes causing a transmitter to transmit the communication to the second IoT device, wherein the second IoT device uses a second proprietary application programming interface, wherein the communication includes the command, and wherein the command is converted from the universal protocol corresponding to the universal application programming interface to a protocol corresponding to the second proprietary application programming interface.

In some embodiments, a computer-program product tangibly embodied in a non-transitory machine-readable storage medium of a first network device may be provided. The computer-program product may include instructions configured to cause one or more data processors to: receive a communication originating from a first IoT device, wherein the first IoT device uses a first proprietary application programming interface, wherein the communication includes a command for a second IoT device to perform, and wherein the command is converted from a protocol corresponding to the first proprietary application programming interface to a universal protocol corresponding to the universal application programming interface; determine that the communication is to be transmitted to the second IoT device; and cause a transmitter to transmit the communication to the second IoT device, wherein the second IoT device uses a second proprietary application programming interface, wherein the communication includes the command, and wherein the command is converted from the universal protocol corresponding to the universal application programming interface to a protocol corresponding to the second proprietary application programming interface.

In some embodiments, the computing device, method, and computer-program product using the universal application programming interface described above may further include wherein the computing device is included in a cloud network. In some embodiments, the first IoT device is assigned a first universally unique identifier, and wherein the second IoT device is assigned a second universally unique identifier. In some embodiments, the received communication includes the second universally unique identifier, and wherein determining that the communication is to be transmitted to the second IoT device is based on the second universally unique identifier. In some embodiments, the receiver is further configured to and may receive a second communication from a third-party messaging account, and the transmitter is configured to and may transmit the second communication to the second IoT device, wherein the second communication controls a function of the second IoT device. In some embodiments, the second communication includes a message and a tag, the tag identifying a destination program of the second IoT device.

According to at least one example, a computing device for communicating with a universal application programming interface that interfaces Internet Things (IoT) devices using different proprietary application programming interfaces may be provided. The computing device includes one or more data processors. The computing device further includes a non-transitory machine-readable storage medium containing instructions which when executed on the one or more data processors, cause the one or more processors to perform operations including receiving a communication from a first proprietary application programming interface of a first IoT device, wherein the communication includes a command for a second IoT device to perform, and wherein the second IoT device uses a second proprietary application programming interface. The operations further include converting the command from a protocol corresponding to the first proprietary application programming interface to a universal protocol corresponding to the universal application programming interface; and causing a transmitter to transmit the communication including the converted command to the universal application programming interface.

In some embodiments, a computer-implemented method of communicating with a universal application programming interface that interfaces Internet Things (IoT) devices using different proprietary application programming interfaces may be provided that includes receiving, at a computing device, a communication from a first proprietary application programming interface of a first IoT device, wherein the communication includes a command for a second IoT device to perform, and wherein the second IoT device uses a second proprietary application programming interface. The method further includes converting the command from a protocol corresponding to the first proprietary application programming interface to a universal protocol corresponding to the universal application programming interface. The method further includes causing a transmitter to transmit the communication including the converted command to the universal application programming interface.

In some embodiments, a computer-program product tangibly embodied in a non-transitory machine-readable storage medium of a first network device may be provided. The computer-program product may include instructions configured to cause one or more data processors to: receive a communication from a first proprietary application programming interface of a first IoT device, wherein the communication includes a command for a second IoT device to perform, and wherein the second IoT device uses a second proprietary application programming interface; convert the command from a protocol corresponding to the first proprietary application programming interface to a universal protocol corresponding to the universal application programming interface; and cause a transmitter to transmit the communication including the converted command to the universal application programming interface.

In some embodiments, the computing device, method, and computer-program product communicating with the universal application programming interface described above may further include wherein the communication is transmitted to a cloud network that includes the universal application programming interface. In some embodiments, the computing device, method, and computer-program product further include: receiving a second communication from the universal application programming interface, wherein the second communication includes a command for a third IoT device to perform, and wherein the third IoT device uses a third proprietary application programming interface; converting the command of the second communication from the universal protocol corresponding to the universal application programming interface to a protocol corresponding to the third proprietary application programming interface used by the third IoT device; and causing the transmitter to transmit the second communication including the converted command to the third IoT device. In some embodiments, the computing device, method, and computer-program product further include: determining a sub-device that is mapped to the third IoT device, wherein converting the command of the second communication includes routing the second communication to the sub-device mapped to the third IoT device. In some embodiments, the computing device, method, and computer-program product further include receiving a second communication from the universal application programming interface, wherein the second communication includes a message from a third-party messaging account, and wherein the second communication controls a function of the second IoT device. In some embodiments, the second communication includes the message and a tag, the tag identifying a destination program of the second IoT device.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 5 is a flowchart illustrating an embodiment of a process of translating between different connection protocols, according to some embodiments.

FIG. 7 is a flowchart illustrating an embodiment of a process of creating a virtual serial cable connection, according to some embodiments.

FIG. 9 is a flowchart illustrating an embodiment of a process of using one or more plug-ins to process communications from different devices, according to some embodiments.

DETAILED DESCRIPTION OF THE INVENTION

Figure 1:
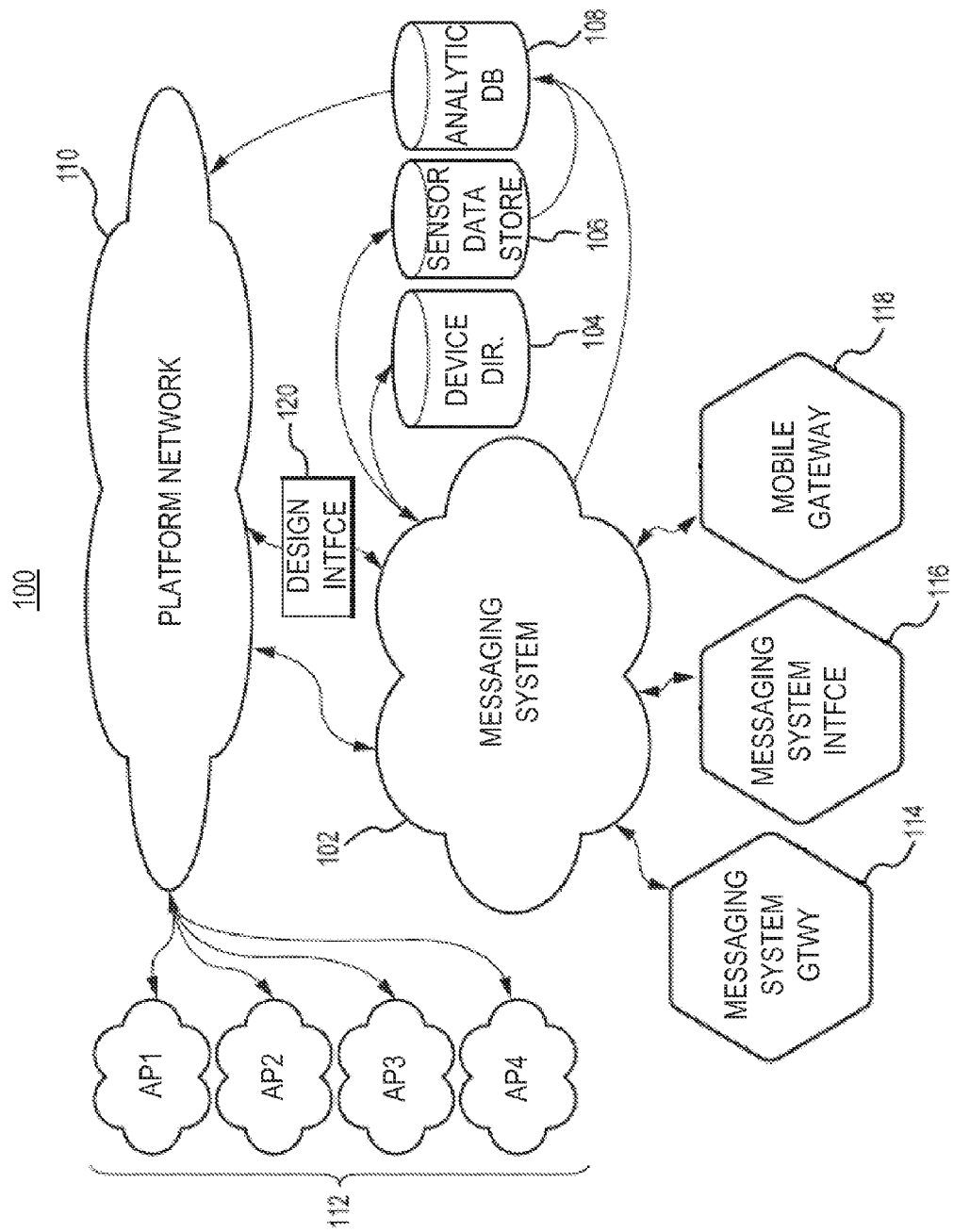
FIG. 1 is a system diagram illustrating an example of a system for connecting devices, such as Internet of Things (IoT) devices, other devices or machines, and/or systems, according to some embodiments.

For the purposes of explanation, the ensuing description provides specific details that are set forth in order to provide a thorough understanding of various embodiments. It will be apparent, however, to one skilled in the art that various embodiments may be practiced without some of these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Networks provide the ability for network connectable devices to communicate with one another. For example, Internet of Things (IoT) systems allow communication among various IoT devices and/or other devices. An IoT system may provide only a limited selection of devices that can interface with one another using the IoT system. For example, devices that can utilize an IoT system may be limited to devices that share a common source and/or manufacturer, devices that operate using a common proprietary connection protocol or interface, devices that have built-in communications capabilities, and/or the like. Limiting the types of devices that can communicate using a specific IoT system constrains the types of functions that can be performed by the devices. For example, a motion sensor built by a manufacture and that uses a first connection protocol may not be capable of communicating with a burglary alarm system built by a different manufacturer and that uses a second connection protocol. Furthermore, vendors that may provide the ability for devices that use different proprietary protocols to communicate have to go through each device's proprietary application programming interface to facilitate message exchange between the devices. For example, a server may receive a message from a first device that uses a first proprietary connection protocol and application programming interface that is destined for a second device that uses a second proprietary connection protocol and application programming interface. The server must send the message to the proprietary cloud server with which the second device is controlled, and the proprietary cloud server accesses the application programming interface used by the second device and sends the message to the second device. The requirement of the server to go through the proprietary cloud server for the message to the sent to the second device adds latency to the message transport from the first device to the second device. Accordingly, techniques and systems are described for providing a common messaging system or interface that allows various devices to exchange machine-to-machine instant messages regardless of whether the devices are built by different manufacturers, operate using different connection protocols or interfaces, or whether the devices are built with the ability to communicate with a network.

FIG. 1 depicts a system 100 for connecting devices, such as IoT devices, other devices or machines, and/or systems. An IoT device may include any network-connectable device or system having sensing or control functionality. An IoT device may be connectable to a local area network (LAN), a personal area network (PAN), and to a wide area network (WAN). For example, an IoT device may include one or more radios operating using one or more communications protocols that allow the IoT device to connect to one or more LANs or PANs, such as WiFi™, ZigBee™, Bluetooth™, Bluetooth low Energy™ (BLE), Infrared Data Association, Transmission Control Protocol (TCP), User Datagram Protocol (UDP), and any other suitable protocol that allows connection to a LAN. A LAN may interconnect various network devices and provide the network devices with the ability to connect to a WAN. A router, modem, access point, or other switching mechanism may be used to control and manage the connections to the network devices. A PAN may provide network access for a user's personal devices (e.g., a network for connecting devices worn or carried by the user, for connecting devices located in the user's workspace, or the like), and may further provide access to other networks, such as a LAN or a WAN. The IoT device may further include one or more radios that allow the IoT device to connect to a WAN, such as the Internet, a private cloud network, a public cloud network, or any other network external to a local network. The system 100 may also include third-party messaging services (e.g., Facebook, twitter, LinkedIn, SMS, etc.) as well as non-IoT devices and systems.

The system 100 may include one or more remote servers, or clouds, that are in communication with other devices or systems via a network, such as the Internet, an intranet, a LAN, a PAN, or a WAN. For example, the system 100 includes a common messaging system 102 (or messaging system 102) that supports machine-to-machine instant message exchange in real-time or near real-time. In some embodiments, the messaging system 102 may be an open source machine-to-machine messaging platform, enabling IoT devices, other devices or machines, and/or systems to message or otherwise communicate with any other IoT devices, other devices or machines, and/or systems. The messaging system 102 may be implemented by one or more remote servers and may allow a IoT device, other device or machine, and/or a system to exchange communications or messages with another device or system regardless of whether the devices or systems are built by different manufacturers, operate using different connection protocols or interfaces, or whether the devices or systems are built with the ability to communicate with a network. While only a single messaging system 102 is shown, one of ordinary skill in the art will appreciate that multiple private or public messaging systems may be implemented using the techniques described herein. One or more remote servers of the messaging system 102 may be connected to a network via the Internet and/or other connection platforms (e.g., a WAN and/or a LAN) such that the servers may be accessed from anywhere in the world. The remote servers allow IoT devices, other devices or machines, and/or systems connected to the servers via the network to communicate and exchange messages with other IoT devices, other devices or machines, and/or systems from anywhere in the world. The remote servers may be configured with enough processing power to run an application, store and process data, and/or perform any other computing task. In some examples, the remote servers may provide enough processing power to operate applications running on devices located remotely from the servers and applications running on the servers themselves.

Messaging system 102 may be configured to support multiple connection protocols, such as any suitable machine-to-machine connection protocol. For example, the messaging system 102 may support connection protocols such as hypertext transfer protocol (HTTP), websockets, message queuing telemetry transport (MQTT), constrained application protocol (CoAP), Extensible Messaging and Presence Protocol (XMPP), Simple Network Management Protocol (SNMP), AllJoyn, and/or any other suitable connection protocol. The multiple connection protocols supported by the messaging system 102 may be referred to herein as native connection protocols of the messaging system 102. Messaging system 102 may also support multiple developer platforms, such as one or more software developer kits (SDKs). For example, the messaging system may support SDKs such as Node.JS. JavaScript, Python, Ruby, or any other suitable SDK. The support of multiple developer platforms and protocols provides programmers with the flexibility to customize functions, instructions, and commands for IoT devices, other devices or machines, and/or systems connected to messaging system 102.

The messaging system 102 may include a cloud infrastructure system that provides cloud services. In certain embodiments, services provided by the cloud infrastructure of messaging system 102 may include a host of services that are made available to users of the cloud infrastructure system on demand, such as registration, access control, and message routing for users, devices or machines, systems, or components thereof. Services provided by the messaging system 102 can be dynamically scaled to meet the demands of users. The messaging system 102 may comprise one or more computers, servers, and/or systems. In some embodiments, the computers, servers, and/or systems that make up the cloud network of the messaging system 102 are different from a user's own on-premises computers, servers, and/or systems. For example, the cloud network may host an application, and a user may, via a communication network such as a WAN, LAN, and/or PAN, on demand, order and use the application. In some embodiments, the cloud network of the messaging system 102 may host a Network Address Translation Traversal application to establish a secure connection between the messaging system 102 and a device or machine. A separate secure connection (e.g., using a native protocol of the messaging system 102) may be established by each device or machine for communicating with the messaging system 102. In certain embodiments, the cloud network of the messaging system 102 may include a suite of applications, middleware, or firmware that can be accessed by a user, device or machine, system, or component thereof.

Upon registering with the messaging system 102, each device or machine, person, and/or system may be assigned a unique identifier and a security token. For example, a device (IoT or other device) or system connected to the messaging system, a person associated with an account or an application that utilizes the messaging system, or the like may be assigned or otherwise provided with a distinct universally unique identifier (UUID) and/or a distinct security token. Each IoT device, other device or machine, system, and/or person using a device must communicate its distinct UUID and security token to the messaging system 102 in order to access the messaging system 102. The messaging system 102 may authenticate the IoT device, other device or machine, system, and/or person using each respective distinct UUID and token. The messaging system 102 may use the UUIDs to process, route, and/or otherwise manage messages and other communications to an appropriate device, person, system, and/or machine. For example, a device may send a message with its UUID and a destination UUID for the device, system, or person to which the message is destined. The messaging system 102 may process, route, and/or otherwise manage the message so that it is received at the appropriate destination.

In some embodiments, one or more components or programs of a device or system may also be assigned a unique identifier and a security token. In some cases, the unique identifier and/or token for the components of a device or system may be the same as the unique identifier and/or token of the device or system itself. In some cases, the unique identifier and/or token for a component or program of a device or system may be different from that of the device or system and may be unique only to the component or program. In some embodiments, components of a device or system that may be assigned a unique identifier may include a sensor (e.g., a camera, motion sensor, temperature sensor, accelerometer, gyroscope, or any other available sensor), an output (e.g., a microphone, siren, display, light, tactile output, or any other available output), a third-party messaging service that the device or system is able to run, or any other component of a device or system that can be identified, accessed, and/or controlled.

Messaging system 102 may further be configured to interact with any application programming interface (API). Each API may also be assigned or otherwise provided with a unique identifier (e.g., a distinct UUID) and/or a security token. Assigning APIs with a unique identifier enables messaging system 102 to receive instructions from and provide instructions to any IoT device, other device or machine, and/or system that is connected to the messaging system 102. Further details describing how the messaging system 102 can interact with any API of any device or system are described herein. By being able to interact with any API, messaging system 102 may control the functionality of all components of a registered IoT device, other device or machine, and/or system that are accessible by the messaging system 102. In some embodiments, messaging system 102 may be configured such that a single message transmitted by messaging system 102 may be communicated to multiple devices and/or systems having different APIs. Accessible IoT devices, other devices or machines, and/or systems include any device that has been registered with messaging system 102 and that has been assigned a unique identifier and/or a security token. For example, a user may purchase an IoT device. The user must register the IoT device with the messaging system 102, and may be assigned a UUID and security token by the messaging system 102 to make the IoT device accessible to the messaging system 102.

Using the common messaging system 102, people, devices, systems, and/or components thereof that have assigned UUIDs can query and communicate with a network of other people, devices, system, and components thereof that have assigned UUIDs and that meet specific search criteria. For example, a device may query the common messaging system 102 searching for a specific type of devices that are located in a particular area, and may receive a list of UUIDs for devices that meet the search criteria. The device may then send a message with a destination UUID assigned to the destination device to which the device wants to send a message.

In some embodiments, messaging system 102 may also detect, connect, and/or communicate with other servers, allowing messaging system 102 to route messages to IoT devices, other devices or machines, and/or systems on the other servers via a server-to-server connection. Server-to-server communications may include connections used to transfer data from one server to another server. For example, a user may use multiple cloud servers to store different types of information. A user may want to transfer data from a first server of a first cloud network to a second server of a second cloud network. A server-to-server communication allows the user to directly transfer or otherwise share this information with the second server. As another example, the messaging system 102 supports inter-cloud communications to allow people, devices or machines, systems, or components thereof to route messages across clouds to other people, devices or machines, systems, or components thereof on other clouds. For instance, a device connected to a private or public cloud network may send a message to another device connected to another private or public cloud.

IoT devices, other devices or machines, and/or systems may be able to connect with the messaging system 102 in several ways. In some embodiments, devices and systems may communicate with the messaging system 102 using a messaging system gateway. For example, IoT devices, other devices or machines, and/or systems may communicate with the messaging system 102 using messaging system gateway or hub 114. The messaging system gateway 114 may be connected to a same LAN as the devices that use the messaging system gateway 114. For example, the messaging system gateway 114 may be installed at a location, such as a home, office, a sports venue, an outside environment (e.g., a park, a city, or the like), or any other suitable location. In some embodiments, the messaging system gateway 114 includes an instance of messaging system software that is configured to interact with the messaging system 102. In some cases, the messaging system gateway 114 may be run on an operating system, such as, but not limited to, Linux™, Mac™ OS, and/or Windows™. In some embodiments, a messaging system gateway 114 may be a standalone physical device, such as a wireless router or modem, which runs the gateway software that connects to the messaging system 102 using a WAN. In some embodiments, a messaging system gateway 114 may be integrated into an IoT device, other device or machine, and/or system by installing the gateway software onto the IoT device, other device or machine, and/or system. For example, the messaging system gateway 114 may be run on computing devices such as a Raspberry Pi, a home and/or office computer, Intel™ Galileo, Beagle Bones, Yuns, and/or other suitable computing device.

Regardless of physical form, the messaging system gateway 114 may operate as an intermediary between the messaging system 102 and the devices or systems that use the messaging system gateway 114. For example, IoT devices, other devices or machines, and/or systems may be connected to messaging system gateway 114, which then links the IoT devices, other devices or machines, and/or systems to the messaging system 102 in real-time. The connection of a device or system to the messaging system 102 via the messaging system gateway 114 allows connected IoT devices, other devices or machines, and/or systems to communicate with one another in real-time. IoT devices, other devices or machines, and/or systems may be connected to messaging system gateway 114 using one or more native connection protocols of the IoT device, other device or machine, and/or system. The protocols may include, but are not limited to, Transmission Control Protocol (TCP), User Datagram Protocol (UDP), WiFi, ZigBee, Bluetooth low energy (BLE), HTTP, websockets, MQTT, CoAP, XMPP, SNMP, AllJoyn, and/or any other suitable connection protocol. In some embodiments, messaging system gateway 114 may broadcast a private network signal such that registered devices and systems may securely connect to the messaging system gateway 114 and to the messaging system 102. Devices and systems that do not have access to the messaging system gateway 114 and messaging system 102 may be unable to process the private network signal.

In some embodiments, messaging system gateway 114 is on a LAN side of a firewall, such as a network address translations (NAT) firewall implemented using a router, or other suitable firewall. In some cases, the messaging system gateway 114 may use websockets to connect to the messaging system 102. The connection between websockets of the messaging system gateway 114 and the messaging system 102 may include a bi-directional persistent connection. The bi-directional persistent connection may auto-reconnect as WAN (e.g., Internet, or the like) connectivity becomes available. By locating the messaging system gateway 114 inside of the firewall, only communications to and from the messaging system gateway 114 have to be granted access to the firewall. Accordingly, the messaging system 102 and any system and/or device connected to the messaging system gateway 114 may communicate through the firewall via the messaging system gateway 114. The messaging system gateway 114 may be used by a person or business to connect various IoT devices, other devices or machines, and/or systems to the messaging system 102, serving as a secure connection for communicating with messaging system 102 much like a personal firewall.

Devices and systems may also be able to communicate with the messaging system 102 using a mobile messaging system gateway that is installed on a mobile device. For example, IoT devices, other devices or machines, and/or systems may be able to connect with the messaging system 102 using a mobile gateway 118. The mobile gateway 118 is similar to a messaging system gateway 114, but instead is installed and operated on a mobile device. For example, mobile gateway 118 may be installed on a mobile phone, tablet, laptop, wearable device, or other suitable mobile device. The mobile gateway 118 may allow the mobile phone to connect to the messaging system 102. The mobile gateway 118 may access all sensors on the mobile device. For example, geolocation sensor data, compass headings, and/or accelerometer data of a mobile phone may be provided to the messaging system 102 through mobile gateway 118. In some embodiments, the mobile gateway 118 may be installed in wearable technology, such as pedometers, headsets, watches, and the like, as well as in Bluetooth™ low-energy devices. In some embodiments, the mobile gateway 118 may also provide a personal area network (PAN) and may allow other devices that are connectable to the mobile device to connect to the messaging system 102 via the mobile gateway 118. For example, one or more devices that do not have an Internet Protocol address and that are not able to connect to a LAN (e.g., a WiFi network or the like) may connect to the mobile gateway 118 using a wired interface or a short-range communication protocol interface, such as Bluetooth, BLE, Zigbee, near field communication (NFC), radio frequency (RF), infrared (IR), or any other suitable communication protocol. These devices may then connect to messaging system 102 through the mobile gateway 118 of the mobile device. The mobile gateway 118 may operate to exchange communications between the devices and the messaging system 102. Devices that do not have an Internet Protocol address and that are not able to connect to a local area network may include wearable technology or other similar devices that only have access to a PAN.

In some embodiments, an IoT device, other device or machine, and/or system may connect with messaging system 102, the messaging system gateway 114, and/or the mobile gateway 118 using a universal messaging system interface 116 that is programmed into the device or system. The built-in universal messaging system interface 116 (or universal interface 116) allows a device or system to perform operations that native firmware of the device or system does not allow it to perform. For example, the messaging system interface 116 may override the native firmware of a device to allow the device to perform various operations that are outside of the functionality of the native firmware. In some embodiments, the messaging system interface 116 may be installed on a device that does not have the ability to communicate with other devices using one or more connection protocols. In such embodiments, the messaging system interface 116 may provide the device with the capability to use one or more connection protocols. The messaging system interface 116 may access one or more sensors, inputs, outputs, or programs on the device or system in order to perform various operations. For example, the messaging system interface 116 may have access to and control a geolocation sensor, a compass, a camera, a motion sensor, a temperature sensor, an accelerometer, a gyroscope, a graphical interface input, a keypad input, a touchscreen input, a microphone, a siren, a display, a light, a tactile output, a third-party messaging service that the device or system is able to run, or any other component of a device or system that can be identified, accessed, and/or controlled.

In some embodiments, the built-in universal messaging system interface 116 may include an operating system that allows the device to communicate with the messaging system 102. Messaging system interface 116 may be installed on an IoT device, other device or machine, and/or system, such as a computing device. For example, the messaging system interface 16 may be installed on a Raspberry Pi board, an Arduino board, a microcontroller, a minicomputer, or any other suitable computing device.

In some embodiments, a device or system running the messaging system interface 116 may connect directly to messaging system 102. In some embodiments, a device or system running the messaging system interface 116 may connect to the messaging system 102 via the messaging system gateway 114 or the mobile gateway 118. The messaging system interface 116 run by the device or system may be assigned a UUID and a token. The messaging system interface 116 may connect to the messaging system 102 using the assigned UUID and token, and may await further instructions from the messaging system 102. In some embodiments, the messaging system 102 may act as a compute server that controls the messaging system interface 116. For example, messaging system 102 may activate and/or deactivate pins of the computing device running the messaging system interface 116, request sensor data from the computing device, and/or cause the messaging system interface 116 to perform other functions related to the computing device. In some embodiments, the messaging system interface 116 can be connected to a gateway (e.g., messaging system gateway 114 or mobile gateway 118), and the gateway may act as a compute server that controls the messaging system interface 116 in a similar manner as described above. In some embodiments, messaging system interface 116 may be a mobile operating system or application that is able to run on mobile device operating systems, such as iOS and Android™ operating systems.

Information from messaging system 102, including information transmitted to messaging system 102 by messaging system gateway 114, mobile gateway 118, and/or messaging system interface 116, may be transmitted to one or more data storage systems. For example, information about IoT devices, other devices or machines, and/or systems registered with the messaging system 102 may be transmitted to device directory 104 for storage. The information about the IoT device, other device or machine, and/or system may be stored in device directory 104 upon registration of the IoT device, other device or machine, and/or system. For example, information related to when the IoT device, other device or machine, and/or system comes online or offline may be stored in device directory 104.

In some embodiments, the device directory 104 may maintain various lists, such as whitelists and/or blacklists, that are associated with a unique identifier (e.g., a UUID) assigned a person, an IoT device, other device or machine, system, and/or component thereof. The use of whitelists and blacklists ensures that devices, systems, and users only have access to those UUIDs of IoT devices, other devices or machines, and/or systems for which permission has been granted. In one example, the device directory 104 may maintain a whitelist for a UUID assigned to a device. The whitelist includes a list or array of UUIDs assigned to devices or systems that are allowed access the device at various levels of access. For example, four levels of access to the device may be granted to other devices or systems, and a separate list or array may be maintained for each level of access. In this example, the whitelist for the device's UUID may include a list or array that includes UUIDs of devices or systems that may discover the device, a list or array of UUIDs of devices or systems that may send a message to the device, a list or array of UUIDs of devices or systems that may receive a message from the device, and/or a list or array of UUIDs of devices or systems that may configure the device. Other levels of access may also be granted, such as the ability of another device or system to subscribe to the device.

In another example, the device directory 104 may also maintain a blacklist for a UUID assigned to the device. The blacklist includes a list or array of UUIDs assigned to devices or systems that are denied access to the device at the various levels of access. In this example, the blacklist for the device's UUID may include a list or array that includes UUIDs of devices or systems that cannot discover the device, a list or array of UUIDs of devices or systems that cannot send a message to the device, a list or array of UUIDs of devices or systems that cannot receive a message from the device, and/or a list or array of UUIDs of devices or systems that cannot configure the device.

In some embodiments, the device directory 104 is queriable, such that a device, system, or user may be provided with a list and/or array of IoT devices, other devices or machines, and/or systems that fit requested search criteria. The messaging system 102 may access the device directory 104 upon receiving a query from a device, system, or user. Upon polling the device directory 104 according to the criteria specified in a query, the messaging system 102 may provide a device with a list or array of UUIDs assigned to IoT devices, other devices or machines, and/or systems that are currently online and that the device has access to according to the device's UUID and/or security token. The use of the whitelists and/or blacklists operates as a security feature, ensuring that devices, systems, and users only have access to other devices, systems, and users to which permission has been granted.

In some embodiments, sensor data from sensors of registered IoT devices, other devices or machines, and/or systems may be transmitted to sensor data storage 106. The sensor data may be streamed from a registered IoT device, other device or machine, and/or system through messaging system 102 in real-time. Sensor data storage 106 is queriable such that a user may poll sensor data storage 106 to receive data from specified sensors during a specified time period. A user may also be able to query the sensor data storage 106 for all available data from one or more sensors. In some embodiments, information from sensor data storage 106, as well as additional information from messaging system 102, may be transmitted to an analytics database 108. In some embodiments, analytics database 108 may not be queried by a user of the system 100. In other embodiments, analytics database 106 may be queried by a user of the system 100. The information stored in analytics database 108 may be accessible via a platform network 110.

In some embodiments, multiple servers or other systems may each operate an instance of software that includes the messaging system 102, thus creating multiple cloud servers and/or instances of messaging systems 102. In some embodiments, a particular instance of messaging system 102 may have its own UUID that allows the instance of messaging system 102 to connect to another instance of messaging system 102 to form a mesh network of messaging systems. Other networks and devices or machines may also be part of the mesh network, such as LANs and PANs and the devices or machines that are interconnected using the LANs and PANs. Each of the LANs and PANs can have their own unique UUID and/or token registered with the messaging system 102. The LANs and PANs are addressable using their unique UUID, and can also address other UUIDs around the world. Such a mesh network may allow messages and other payloads to be routed between devices across messaging systems 102. Accordingly, the messaging system 102 supports inter-cloud communications to allow people, devices or machines, systems, or components thereof to route messages across clouds to other people, devices or machines, systems, or components thereof on other clouds. Each of the cloud networks may run an instance of the messaging system 102. For instance, a device connected to a private or public cloud network may send a message to another device connected to another private or public cloud.

As described above, each person, device or machine, system (e.g., cloud network running an instance of the messaging system, a LAN, a PAN, or the like), or components thereof that is registered with the messaging system 102 is assigned a UUID. Each person, device or machine, system, or components thereof can be referenced by the messaging system using its UUID. Each of the UUIDs can discover other UUIDs (e.g., clouds, other networks, people, or devices or machines) using one or more queries, such as using multicast Domain Name System (MDNS) or API queries. In some embodiments, a UUID can connect to multiple networks thus forming a global mesh network including different networks (e.g., multiple cloud networks, LANs, PANs, or a combination of cloud networks, LANs, and/or PANs). A cloud network running an instance of messaging system may also be assigned an UUID and can route messages across cloud networks via inter-cloud communications using a routing paradigm. For example, a cloud network can send a message across cloud networks by sending the message with a route UUID_1/UUID_2/UUID_3/UUID_4, with each UUID be assigned to a different cloud network. In some embodiments, the mesh network may route the message based on known connections.

Platform network 110 may include one or more analytics engines that may process the information received from the analytics database 108. The analytics engines may aggregate the received information, detect trends, and/or perform other analytics on the information. Platform network 110 may be communicatively coupled with a number of APIs 112 that are used to create, manage, identify, and/or communicate with functions of different IoT devices, other devices or machines, and/or systems. APIs may include, for example, sales analytics APIs, social media account and other third-party messaging account APIs, stock quote APIs, weather service APIs, other data APIs, mobile application APIs, and any other suitable API. For example, a Facebook™ or other social media message may use a messaging API to send SMS messages. Platform network 110 may use the messaging API to deliver a payload to a device or system configured to display a SMS message. A light API may be provided by a manufacturer of "smart" light bulbs. The platform network 110 would then use this light API to provide an output to turn a light bulb connected to the platform network 110 on or off. Platform network 110 is also in communication with messaging system 102 using the APIs of messaging system 102. Platform network 110 may interact with the IoT devices, other devices or machines, and/or systems connected through the messaging system 102 using UUIDs and/or security tokens.

The UUIDs and/or security tokens may be issued by the messaging system 102 and/or the platform network 110. In some embodiments, a user may register systems and/or devices with the messaging system 102. The platform network 110 may import or otherwise utilize any UUIDs and/or tokens issued by the messaging system 102 during the registration. In some embodiments, a user may register devices and/or systems with the platform network 110. The platform network 110 may issue UUIDs and security tokens to IoT devices, other devices or machines, and/or systems upon registration of the IoT device, other device or machine, and/or system. The UUIDs and security tokens are used to access the messaging system 102, as described above. In some embodiments, a user may register devices and/or systems with both the messaging system 102 and the platform network 110. Either messaging system 102 or platform network 110 may issue UUIDs and/or tokens. Registration with the non-issuing system or network creates a link or other association with the issued UUIDs and/or security tokens.

Platform network 110 may operate an application or other program that provides a designer graphical interface that allows a user to create a control system or flow. The designer graphical interface may allow the user to create a control system by dragging and dropping blocks that represent various devices and/or systems of the control system, inputs and/or outputs from the various devices and/or systems, and/or functions for controlling the devices and/or systems. Any IoT device, other device or machine, and/or system that is registered with platform network 110 may be configured to receive or transmit a message to any other IoT device, other device or machine, and/or system that is registered with platform network 110 using an appropriate control system designed using the designer graphical interface. Messages may be transmitted from one device or system to control operation of another device or system. For example, the platform network 110 may run control systems continuously, such that an input from a device or system may automatically cause an event to occur in a different location and/or by a different device or system. Such functionality, along with access to the data from analytics database 108, enables the platform network 110 to monitor a performance, behavior, and/or state of any IoT device, other device or machine, and/or system within the control system and to send a resulting message or payload to any other IoT device, other device or machine, and/or system in the control system based on the monitored performance, behavior, and/or state. In another example, the platform network 110 may run a control system designed using the designer graphical interface upon receiving a command, such as from a user or from another device or system. In some embodiments, the designer graphical interface operated by the platform network 110 may access any IoT device, other device or machine, and/or system connected to messaging system 102, including IoT devices, other devices or machines, and/or systems connected using the messaging system gateway 114, messaging system interface 116, and/or mobile gateway 118. This connection enables control systems created using the designer graphical interface to control output functions of devices and/or systems registered with the messaging system 102. For example, real-time monitoring of data at a remote location, such as performance of a machine or system, or of a person's health condition may be performed by the platform network 110.

The platform network 110 may also automatically provide messages or other outputs, including commands, to any of the registered IoT devices, other devices or machines, and/or systems based on processes performed on information received from IoT devices, other device or machine, and/or system. For example, sensor data may be received from an IoT device and processed by analytics systems of the platform network 110. Using artificial intelligence and/or machine learning within the platform network 110, the processed sensor data may be used to provide commands to another system or device connected to platform network 110.

In some embodiments, platform network 110 may be connected with messaging system 102 through a web-based design interface 120. Web-based design interface 120 may include similar functionality as the designer of platform network 110, but operates as a web-based application. Users may design control systems and flows on web-based design interface 120 and test the control systems prior to fully deploying a control system into platform network 110. Users may have access to all IoT devices, other devices or machines, and/or systems associated with messaging system 102 and/or platform network 110, although the processing functions available using the web-based design interface 120 are limited to those provided by a web browser. Web-based design interface 120 may act as a developer design tool that functions through the capabilities of the web browser. A user may then import the control system into platform network 110 for continuous operation of the control system.

Devices or machines, systems, or components thereof that are each assigned individual UUIDs may continuously stream data (e.g., sensor data) to the messaging system 102. The streamed data may be stored in device directory 104, sensor data storage 106, and/or to the analytics database 108. The streamed data from the UUIDs may be reacted upon in real-time. As described in more detail below, UUIDs or user control system or flow created using the platform network 110 can subscribe to other UUIDs streaming the data. Based on thresholds within the data, frequency of occurrence of certain data, or the occurrence of the data itself, events can be created that trigger messages to be exchanged between devices or machines and/or systems. For example, a photo sensor with an assigned UUID that senses a change in light may stream sensor data to the messaging system 102, and a control system created using the platform network 110 may indicate that anytime a change in light occurs, a light with an assigned UUID should be turned on or off. The control system may subscribe to the UUID of the sensor so that it can detect when a change in light occurs. When the control system senses a light change, it may trigger a message to be sent to the light in order to cause the light to change states (e.g., on or off). In some examples, the sensor data and message exchanges or other transactions may be streamed into the analytics database 108 for real-time, near real-time, and/or offline data analytics.

In some embodiments, UUIDs can subscribe to other UUIDs with or without tokens (provided security permissions allow it). Subscribing with the device's UUID with a token allow a person, device, or system to "spy" on the device's inbound and outbound communications in an eavesdropping mode. Subscribing without the device's token may only allow the subscribing device access to the messages broadcast by the device (provided security permissions allow it).

Figure 2:
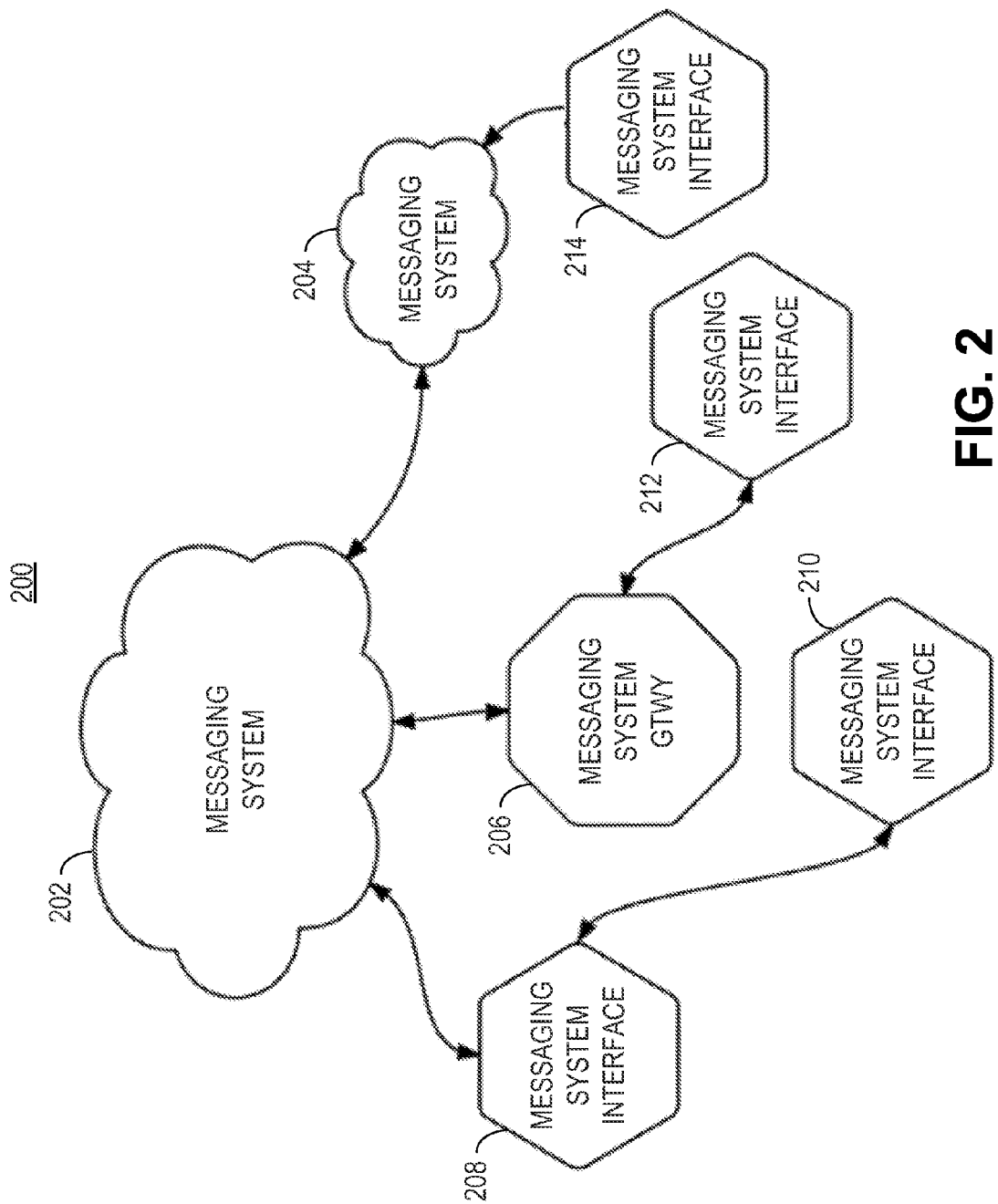
FIG. 2 is a system diagram illustrating an example of a system for exchanging machine-to-machine instant messages between systems and devices or machines, according to some embodiments.

FIG. 2 illustrates an example of a system 200 implementing various components of FIG. 1. The system 200 allows the real-time exchange of machine-to-machine instant messages between devices and/or systems. Network 200 includes a messaging system 202 and a messaging system 204. The messaging systems 202 and 204 may be similar to the messaging system 102 described above with respect to FIG. 1, and may perform one or more of the functions described above. Either of the messaging systems 202 and 204 may be part of a private or a public cloud network. For example, messaging system 202 may be part of a public cloud network with which any device, system, or user may be registered. Messaging system 204 may be part of a private cloud network that is restricted for use by only select devices, systems, or users. For example, the private messaging system 204 may be restricted for use by employees and affiliates of a particular company.

The system 200 may further include one or more messaging system interfaces implemented by one or more machines or devices. For example, the system 200 includes messaging system interface 208, messaging system interface 210, messaging system interface 212, and messaging system interface 214. The messaging system interfaces 208, 210, 212, 214 may be similar to the messaging system interface 116 described above with respect to FIG. 1, and may perform one or more of the functions described above. The messaging system interfaces 208, 210, 212, 214 may each be installed on a separate computing device and integrated with a separate machine or device. For example, the messaging system interfaces 208, 210, 212, or 214 may be installed on a computing device, such as a Raspberry Pi board, an Arduino board, a microcontroller, a minicomputer, or any other suitable computing device. The computing devices with the installed messaging system interfaces 208, 210, 212, or 214 may then be integrated with separate devices or machines. Accordingly, four machines may each be integrated with a computing device installed with one of the messaging system interfaces 208, 210, 212, and 214. Devices or machines can include any electronic device, including sensors and consumer products such as light bulbs, thermostats, home automation devices, smoke alarms, burglary alarms, an accelerator or other electronic component of a vehicle, a display device, a printer, or any other electronic device.

The system 200 may further include one or more messaging system gateways, including a messaging system gateway 206 and a mobile gateway (not shown). The messaging system gateway 206 may be similar to the messaging system gateway 114 described above with respect to FIG. 1, and may perform one or more of the functions described above. In some embodiments, the messaging system gateway 206 may include a mobile gateway, similar to the mobile gateway 118 described above with respect to FIG. 1. The messaging system gateway 114 may be connected to a local area network (LAN) and/or to a personal area network (PAN).

Any machine that has been assigned a unique identifier (e.g., a UUID) by the messaging system 202 or messaging system 204 and that has the ability to connect to a wide area network (WAN) (e.g., an IoT device) can connect directly to the messaging system 202. In some embodiments, only the messaging system 202 issues unique identifiers to people, machines or devices, systems, or components thereof. In such embodiments, the messaging system 204 may use the unique identifiers that are issued by the messaging system 202. In some embodiments, the messaging systems 202 and 204 are independent messaging systems, and each messaging systems 202 and 204 may issue different unique identifiers. Machines with or without unique identifiers can connect to the messaging system gateway 206. A machine with an assigned unique identifier and the appropriate access level permission can query the network 200 from anywhere in the world for other machines that meet a specific search criteria. The machine may message the other machines via the messaging system 202.

The messaging systems 202 and 204 support inter-cloud communications, allowing machines to route messages across the messaging systems 202 and 204 to devices and sub-devices on other cloud networks. For example, the machine running the messaging system interface 214 is connected to the private messaging system 204 cloud network, and can send a message to a machine running the messaging system interface 208 that is connected to the public messaging system 202. The machine running the messaging system interface 214 may be located in New York, N.Y., and the machine running the messaging system interface 208 may be located in London, England. The machine running the messaging system interface 214 may send the message to a route of UUIDs corresponding to the path that the message must follow in order to reach the machine running the messaging system interface 208. The route may be included in a routing list that is included in the message (e.g., in a field of the message, such as a header field). For example, the routing list for the message may include a route of UUIDs that includes UUID_MSGSYS204/UUID_MSGSYS202/UUID_MSGSYSINT208. The messaging system 202 may assign the UUID_MSGSYS204 to the messaging system 204, the UUID_MSGSYS202 to itself, and the UUID_MSGSYSINT208 to the machine running the messaging system interface 208. The network servers of the messaging systems 202 and 204, the messaging system gateway 206, and the machines or devices running the messaging system interfaces 208, 210, 212, 214, if included in the route, may each remove their UUID from the routing list and pass the message on to the next UUID in the list until the message arrives at its destination. The same routing technique may be used to send messages within the same messaging system cloud network or across multiple messaging system cloud networks.

In some embodiments, devices or machines can also communicate with other devices or machines via one or more peer-to-peer sockets rather than going through a messaging system 202 or 204. For example, the machine running the messaging system interface 208 may directly communicate with the machine running the messaging system interface 210. One or more dynamic routing protocols may be used by the machines when exchanging communications via a peer-to-peer connection. In some embodiments, devices or machines may discover and be introduced to other devices or machines using the messaging system 202. After being introduced by the messaging system 202, the devices or machines may then begin a peer-to-peer communications session directly provided they have the proper security permissions. For example, the machine running the messaging system interface 208 may query the messaging system 202 for machines that meets certain criteria (e.g., Philips Hue™ light bulbs in a particular location, or other suitable search criteria). The messaging system 202 may check the security permissions of the machine running the messaging system interface 208, and may return a list or array of UUIDs assigned to machines that meet the criteria and for which the machine running the messaging system interface 208 has permission to access. One of the machines on the list or array may include the machine running the messaging system interface 210. The machines running messaging system interfaces 208 and 210 may then begin a peer-to-peer communications session to directly exchange messages.

In some embodiments, the messaging system 202 may store various properties of each registered person, machine or device, system, or component thereof that has an assigned UUID. Each registered person, machine or device, system, or component thereof may have a registry store in which the properties may be stored. For example, the registry store for each registered person, machine or device, system, or component thereof may be stored in a device directory similar to the device directory 104 described above. The properties can be anything that describes the person, machine or device, system, or component thereof, including status or state (e.g., on, off, idle, sleeping, or the like), type, color, features, connection protocols, geolocation, or the like. For example, one or more servers of the messaging system 202 may track how each registered machine or device is connected to the messaging system 202 or to a messaging system gateway (e.g., gateway 206). The messaging system 202 may also track the geolocation of each device or machine. For example, the messaging system 202 may store in a registry store for each machine or device the connection protocol used by each machine or device and the geolocation of each machine or device at a given point in time. The geolocation may be stored as a set of coordinates (e.g., global positioning system (GPS) coordinates, latitude-longitude coordinates, or the like). The connection protocol and the geolocation may be updated each time either changes. For example, if a machine or device changes locations or connects with the messaging system using a different connection protocol, the messaging system 202 may update the machine's registry store with the updated connection protocol and/or geolocation. In some embodiments, the messaging system 202 can store all of the connection protocols for which a machine or device is configured to operate. The properties may be updated in real-time as the change occurs, or in partial real-time at different points in time (e.g., every 1 minute, 2 minutes, 5 minutes, 30 minutes, 1 hour, or other appropriate period of time).

The messaging systems 202 and 204 operate using one or more native connection protocols. For example, the messaging systems 202 and 204 may natively recognize a HTTP connection protocol, a websockets connection protocol, a MQTT connection protocol, a CoAP connection protocol, an XMPP connection protocol, a SNMP connection protocol, an AllJoyn connection protocol, or any other appropriate connection protocol. One of ordinary skill in the art will recognize that the messaging systems 202 and 204 may natively operate using any other appropriate machine-to-machine connection protocol. Other protocols may be added to the messaging system 202 or 204 over time as the protocols become more universally used.

The messaging system 202 may also include a universal application programming interface that is available for use by all of the native connection protocols of the messaging system 202. The universal application programming interface may be used to interface Internet Things (IoT) devices that use different proprietary application programming interfaces. The universal application programming interface allows the messaging system 202 to avoid having to go through each machine's proprietary cloud network and proprietary application programming interface to facilitate message exchange between machines that use different proprietary protocols to communicate. Without a universal application programming interface, a server may receive a message from a first device that is destined for a second device. The first device may use a first proprietary connection protocol and application programming interface and the second device may use a second proprietary connection protocol and application programming interface. The server would have to send the message to the proprietary cloud server with which the second device is registered. The proprietary cloud server would then access the application programming interface used by the second device, and send the message to the second device. Such a procedure of sending the messages to a different proprietary cloud network using different application programming interface requests for each different proprietary protocol used adds latency to the message transport from the first device to the second device. Using the universal application programming interface, the messaging system 202 can receive messages from the first device, and can directly send the messages to the second device (or to a local gateway to which the second device is connected via a LAN or PAN) using a single application programming interface request.

The universal application programming interface supports various commands. For example, the universal application programming interface allows users, machines or devices, systems, or components thereof to get a status of the messaging system 202 (e.g., online, offline, temporarily offline, or the like). The universal application programming interface also allows a machine or device to be registered with the messaging system 202. Upon receiving a registration request, the universal application programming interface may return a UUID and a security token to the registrant. The universal application programming interface also specifies how queries from users, machines or devices, systems, or components thereof are handled. For example, the universal application programming interface may allow the messaging system 202 to return a list of UUIDs that correspond to a query for different users, machines or devices, systems, or components thereof. As another example, the universal application programming interface may allow the messaging system 202 to return information related to a specific machine or device in response to a query for information relating to the machine or device. The universal application programming interface also describes how to update features of (e.g., change a location, connection protocol, color, or other feature) or control (e.g., turn on/off, move to a different location, or the like) registered machines or devices in response to requests from users, machines or devices, systems, or components thereof to make the changes (and that have permission to do so). One of ordinary skill in the art will appreciate that the universal application programming interface can specify to the servers of the messaging system 202 how to perform various generic functions that relate to any connected users, machines or devices, systems, or components thereof.

One or more computing devices of the messaging system 202 can route messages to and from any connected machine or device in any supported protocol (whether native or transformed by a plug-in, as described below). The computing devices may include one or more network servers. The messaging system 202 may translate between the different native connection protocols to facilitate message exchanges between machines or devices that operate using different connection protocols. For example, the common messaging system may translate a received communication that is in a first native connection protocol to a second native connection protocol before sending the communication to a machine or device that only operates using the second native connection protocol or that operates using a connection protocol that is different than the first and second native connection protocols (in which case a plug-in would be needed to convert from the second native connection protocol to the protocol that the machine uses). In one example, a MQTT device can use the messaging system 202 to communicate a message to a CoAP device, a websocket-powered device, or a web page via HTTP. The messaging system 202 can thus interpret or translate the message to the destination device's connected or preferred connection protocol.

In one example, a computing device may be used for interfacing Internet Things (IoT) devices that use different connection protocols. For example, the computing device may be a network server of the messaging system 202, and may include one or more data processors. The computing device may also include a receiver. A first IoT device may transmit a communication destined for a second IoT device across a WAN or to a messaging system gateway (e.g., messaging system gateway 206) via a LAN and/or PAN. The first IoT device may include a messaging system interface. The receiver of the computing device may receive the communication from the first IoT device. The first IoT device may be communicatively connected to the computing device using a first connection protocol and the communication may be received using the first connection protocol. The first connection protocol may be a connection protocol that is native to the computing device of the messaging system 202. For example, the first connection protocol may be a MQTT connection protocol.

The computing device may include a non-transitory computer-readable storage medium containing instructions that, when executed on the one or more data processors, cause the one or more processors to perform various operations. The computing device may determine a second IoT device to which the communication is intended to be transmitted. The computing device may also determine a second connection protocol used by the second IoT device. For example, the first IoT device may be assigned a first UUID, and the second IoT device may be assigned a second UUID. The received communication may include the second UUID (e.g., in a field of a communication packet). The computing device may determine the identity of the second IoT device and the second connection protocol used by the second IoT device based on the second UUID. For example, the computing device may refer to a registry store (e.g., in the device directory of messaging system 202) that is associated with the second UUID in order to determine the connection protocol used by the second IoT device. The computing device may then translate the communication to the second connection protocol that corresponds to the protocol with which the second IoT device is connected to the computing device of the messaging system 202. The first connection protocol is different than the second connection protocol. For example, the second connection protocol may be a HTTP connection protocol. In some embodiments, the first IoT device may not be configured to communicate using the second connection protocol, and the second IoT device may not be configured to communicate using the first connection protocol.

The computing device may further include a transmitter for transmitting the communication to the second IoT device that is communicatively connected to the computing device using the second connection protocol. The communication is transmitted using the second connection protocol.

In some embodiments, the receiver is configured to and may receive a response to the communication from the second IoT device. The response may be received using the second connection protocol with which the second IoT device is communicatively connected to the computing device. The computing device may then translate the response to the first connection protocol with which the first IoT device is communicatively connected to the computing device. The transmitter is configured to and may transmit the response to the first IoT device using the first connection protocol.

In some embodiments, the receiver is configured to and may receive a second communication from a third-party messaging account. The transmitter is configured to and may transmit the second communication to the second IoT device. The second communication received from the third-party messaging account controls a function of the second IoT device. For example, the third-party messaging account may be an account of a third-party messaging service, such as Facebook™, Twitter™, LinkedIn™, SMS, or any other messaging service that allows a user of a device to send and receive messages using a registered account. In some embodiments, the second communication includes a message and a tag. The tag identifies a destination program of the second device, such as an application or program that enables a machine or device to send messages using the third-party messaging accounts. For example, the tag may identify an identifier of the application or program. Upon being received by the application or program of the second device, the destination application or program may be opened and the tagged data may be entered into the application or program to activate the indicated function.

In some embodiments, the messaging system gateway 206 may include one or more messaging system plug-ins. In some embodiments, one or more plug-ins may be installed on one or more computing devices, such as a microcontroller, a minicomputer, or any other suitable computing device in the messaging system gateway 206. In some embodiments, one or more plug-ins may be added to one or more existing programs of the messaging system gateway 206. In some examples, each plug-in may include program code that knows how to interact with the messaging system gateway 206. For example, a plug-in may include a JavaScript piece of code. In some examples, when sending messages from a machine to the messaging system 202, a messaging system plug-in may translate or convert one or more connection protocols that are used by the machine and that are not native to the messaging system 202 to a native connection protocol of the messaging system 202. When sending messages from the messaging system 202 to the machine, the messaging system plug-in of the gateway 206 may also translate the native connection protocols of the messaging system 202 to the protocols used by the machine. In some examples, a messaging system plug-in may also translate or map one or more proprietary application programming interfaces used by a machine to a universal application programming interface of the messaging system 202. Similar plug-ins may be used in a mobile gateway (e.g., mobile gateway 118), and may perform similar functions as those described herein. For example, a mobile gateway may allow a user to interconnect various devices worn or carried by the user via a PAN provided by the mobile gateway, as described above. One or more plug-ins of the mobile gateway may allow the devices to communicate with the messaging system 202, similar to the plug-ins of the messaging system gateway 206.

To perform the translation, a plug-in may define a message schema that corresponds to the format of the messages required to communicate with a particular machine or device. For example, a message with a command from the messaging system 202 may instruct one or more machines to perform a function, such as to turn off all lights in a room. The message may be transmitted in a general format of the universal application programming interface that is not specific to the proprietary application programming interfaces of the different machines. The message may also be transmitted by the messaging system 202 using a connection protocol that is not used by the different machines. The proprietary application programming interfaces of the machines may only be configured to receive messages in a certain format, and the message from the messaging system 202 may not be in any of the specific formats. The one or more plug-ins that are used to translate messages for the different machine may translate the message into the format that is required by each of the proprietary application programming interfaces. The plug-ins may also transmit the message to the machines using the proprietary connection protocol for which the machines are configured to operate.

Accordingly, the messaging system gateway 206 supports an open plug-in architecture that translates non-native connection protocols, such Phillips Hue™, Nest™, Belkin Wemo™, Insteon™, SmartThings™, or any other appropriate proprietary, legacy, or new connection protocols, to native protocols and/or to a universal application programming interface of the messaging system 202. In some cases, one or more of the machines or devices themselves may include a messaging system plug-in. Each machine or device that runs proprietary firmware and/or that uses proprietary application programming interfaces can include one or more plug-ins that translate the proprietary communications to and from the connection protocols used by the messaging system 202. The plug-in architecture allows proprietary, legacy (e.g., RS-232 serial, RF, or the like), and/or new machines or devices (e.g., BLE wearable devices or the like) to be registered with and communicate with the messaging system 202 regardless of the connection protocol natively used by the machines or devices.

The messaging system gateway 206 may include multiple plug-ins. For example, a set of machines or devices may be connected to the messaging system gateway 206. Different plug-ins may be used by different subsets of machines or devices that are connected to the messaging system gateway 206. The different subsets of machines may relate to different classes of devices. For example, machines may be broken into classes based on a manufacturer of the devices, a connection protocol and/or application programming interface used by the devices, or any other appropriate classification. Each of the devices that are connected to the messaging system gateway 206 may be assigned to a logical sub-device that the messaging system gateway 206 keeps track of. The messaging system gateway 206 may assign and map each logical sub-device to a particular plug-in. For example, the messaging system gateway 206 may store a record of all devices, with the record of each connected device including a separate sub-device and plug-in combination. In one example, three Philips Hue™ lights and two Nest™ smoke alarms may be connected to the messaging system gateway 206 for communicating with the messaging system 202. The messaging system gateway 206 may have a stored record for each device, including five records. The three records for the three Philips Hue™ lights may each include a separate sub-device (e.g., sub-device_A, sub-device_B, sub-device_C) and a plug-in that is specifically configured to translate between the messaging system 202 native connection protocols and application programming interfaces and the Philips Hue™ connection protocols and application programming interfaces. Similar records may be stored for the two Nest™ smoke alarms, including two records storing a separate sub-device for each smoke alarm (e.g., sub-device_D, sub-device_E) and a plug-in that is configured to translate between the messaging system 202 native connection protocols and application programming interfaces and the Nest™ connection protocols and application programming interfaces. In some embodiments, the messaging system gateway 206 may include a single plug-in that is configured to and may translate between multiple proprietary connection protocols and application programming interfaces.

In one example of the universal application programming interface, a computing device may be provided with the universal application programming interface. The computing device may be included in a cloud network. For example, the computing device may include one or more network servers of the messaging system 202. The computing device includes one or more data processors and a receiver for receiving a communication originating from a first IoT device. The first IoT device may use a first proprietary application programming interface and the communication may include a command for a second IoT device to perform. The command may be converted from a protocol corresponding to the first proprietary application programming interface to a universal protocol corresponding to the universal application programming interface. For example, either the computing device of the messaging system 202 or a plug-in of a messaging system gateway (e.g., messaging system gateway 206) may convert the command to a format that is understood by the universal application programming interface, as described above.

The computing device may include a non-transitory computer-readable storage medium containing instructions that, when executed on the one or more data processors, cause the one or more processors to perform various operations. The computing device may determine that the communication is to be transmitted to the second IoT device. For example, the first IoT device may be assigned a first UUID, and the second IoT device may be assigned a second UUID. The received communication may include the second UUID (e.g., in a field of a communication packet). The computing device may determine the identity of the second IoT device based on the second UUID. The computing device may then cause a transmitter to transmit the communication including the command to the second IoT device. The second IoT device may use a second proprietary application programming interface. The command may be converted from the universal protocol corresponding to the universal application programming interface to a protocol corresponding to the second proprietary application programming interface. For example, either the computing device of the messaging system 202 or a plug-in of a messaging system gateway (e.g., messaging system gateway 206) may convert the command to a format that is usable by the second proprietary application programming interface, as described above.

In some embodiments, the receiver is configured to and may receive a second communication from a third-party messaging account. The transmitter is configured to and may transmit the second communication to the second IoT device. The second communication received from the third-party messaging account controls a function of the second IoT device. For example, the third-party messaging account may be an account of a third-party messaging service, such as Facebook™, Twitter™, LinkedIn™, SMS, or any other messaging service that allows a user of a device to send and receive messages using a registered account. In some embodiments, the second communication includes a message and a tag. The tag identifies a destination program of the second device, such as an application or program that enables a machine or device to send messages using the third-party messaging accounts. For example, the tag may identify an identifier of the application or program. Upon being received by the application or program of the second device, the destination application or program may be opened and the tagged data may be entered into the application or program to activate the indicated function.

In some examples of using one or more plug-ins, a computing device may be provided for communicating with the universal application programming interface of the messaging system 202. In some embodiments, the computing device may be included in the messaging system gateway 206, and may execute the one or more plug-ins. In some embodiments, the computing device may be included in a mobile gateway (e.g., mobile gateway 118), and may execute the one or more plug-ins. The computing device includes one or more data processors and a non-transitory computer-readable storage medium containing instructions which when executed on the one or more data processors, cause the one or more processors to perform various operations. The computing device may receive a communication from a first proprietary application programming interface of a first IoT device. The communication may include a command for a second IoT device to perform. For example, the first IoT device may include a smoke alarm and the second IoT device may include a lighting system controller connected to one or more lights. The first and second IoT devices may be connected to the computing device via a local area network, a personal area network, or a combination of a local area network and a personal area network. The command may include a message indicating that the smoke alarm has detected smoke, and that the lighting system controller should turn on the one or more lights. The second IoT device may use the first proprietary application programming interface or a second proprietary application programming interface that is different than the first proprietary application programming interface. The computing device may convert the command from a protocol corresponding to the first proprietary application programming interface to a universal protocol corresponding to the universal application programming interface, using the techniques described above. The computing device may further cause a transmitter to transmit the communication including the converted command to the universal application programming interface of the messaging system 202 cloud network. The universal application programming interface may process the command, determine the identity of the second IoT device, and route the command to the appropriate networks or devices so that it can reach the second IoT device. The command may then be received by the second IoT device or a messaging system gateway connected to the second IoT device. A plug-in of the messaging system gateway may then convert the command to a command that can be carried out by a proprietary application programming interface of the second IoT device.

The computing device may further receive a second communication from the universal application programming interface that includes a command for a third IoT device to perform. The third device may include another device connected to the computing device via the local area network, the personal area network, or a combination of the local area network and the personal area network. The third IoT device uses a third proprietary application programming interface. The computing device may convert the command of the second communication from the universal protocol corresponding to the universal application programming interface to a protocol corresponding to the third proprietary application programming interface used by the third IoT device. The computing device may then cause the transmitter to transmit the second communication including the converted command to the third IoT device.

In some embodiments, the computing device determine a sub-device that is mapped to the third IoT device. The computing device may route the second communication to the sub-device mapped to the third IoT device, and may determine a plug-in that applies to the sub-device. As described above, the sub-device is mapped to a particular plug-in and can be used to identify the plug-in to use to convert the command to the proprietary application programming interface.

In some embodiments, the computing device may receive a third communication from the universal application programming interface. The third communication may include a message from a third-party messaging account. The third communication from the third-party messaging account controls a function of the second IoT device. For example, the third-party messaging account may be an account of a third-party messaging service, such as Facebook™, Twitter™, LinkedIn™, SMS, or any other messaging service that allows a user of a device to send and receive messages using a registered account. In some embodiments, the third communication includes a message and a tag. The tag identifies a destination program of the second device, such as an application or program that enables a machine or device to send messages using the third-party messaging accounts. For example, the tag may identify an identifier of the application or program. Upon being received by the application or program of the second device, the destination application or program may be opened and the tagged data may be entered into the application or program to activate the indicated function.

Working in combination, the messaging system 202 and the messaging system gateway 206 (and/or a mobile gateway) with the plug-ins allow machines or devices to communicate with one another regardless of the proprietary nature of the connection protocols or application programming interfaces that are used by the machines or devices. In the example above including the three Philips Hue™ lights and two Nest™ smoke alarms, a smoke alarm may communicate with one or more of the lights by sending messages to the messaging system 202 via the messaging system gateway 206. For example, when smoke is detected by the smoke alarm, the smoke alarm may transmit a message to the messaging system gateway 206 instructing all of the lights to turn on. A plug-in of the messaging system gateway 206 may translate the message from the proprietary Nest™ format to a generic, native format used by the messaging system 202. The messaging system 202 may determine a destination for the message by referring to one or more UUIDs that are included in the message. In some embodiments, the messaging system 202 may determine a destination based on a query included in the message. For example, the message may indicate that the message is to be sent to all lights that are located within a particular geolocation (e.g., within a certain distance from the smoke alarm). Once the messaging system 202 determines that the destination for the message includes the three lights, the messaging system 202 may process the message using the universal application programming interface. For example, the messaging system 202 may authenticate the smoke alarm using its UUID and token combination, and may determine the security permissions of the smoke alarm in order to verify that the smoke alarm has appropriate access to the lights (e.g., that the smoke alarm is permitted to discover and send messages to the lights).

As previously described, the system 200 also includes messaging system interface 208, messaging system interface 210, messaging system interface 212, and messaging system interface 214. The machines running the messaging system interfaces 208, 210, 212, 214 may directly connect with the messaging system 202 or may connect with the messaging system gateway 206 using the universal messaging system interfaces 208, 210, 212, 214. In some embodiments, the machine running the messaging system interface 208 may be a closed-network machine that is designed to communicate with a proprietary network in order to transmit and receive communications to other machines that operate using the same proprietary protocols. The messaging system interface 208 allows the machine to communicate directly with the messaging system 202 without going through the proprietary network. By communicating directly with the messaging system 202, the machine can communicate with any machine registered with the messaging system 202 regardless of the proprietary nature of the other machines. In some embodiments, the messaging system interfaces 208, 210, 212, or 214 may be an operating system that allows the machine running the messaging system interface 208, 210, 212, or 214 to communicate with the messaging system 202.

The built-in universal messaging system interfaces 208, 210, 212, 214 allow the machine running the universal messaging system interfaces 208, 210, 212, 214 to perform operations that native firmware of the machines does not allow them to perform. For example, the messaging system interface 210 may override the native firmware of its machine to allow the machine to perform various operations that are outside of the functionality of the native firmware. In some embodiments, the messaging system interface 210 may be installed on a machine that does not have the ability to communicate with other machines using one or more connection protocols. In such embodiments, the messaging system interface 210 may provide the machine with the capability to use one or more connection protocols. The messaging system interfaces 208, 210, 212, 214 may access one or more sensors, inputs, outputs, or programs on the machines running them in order to perform various operations. For example, the messaging system interface 212 may have access to and control a geolocation sensor, a compass, a camera, a motion sensor, a temperature sensor, an accelerometer, a gyroscope, a graphical interface input, a keypad input, a touchscreen input, a microphone, a siren, a display, a light, a tactile output, a third-party messaging service that the machine is able to run, or any other component of the machine that can be identified, accessed, and/or controlled.

The messaging system interfaces 208, 210, 212, 214 may each be assigned a different UUID and token. The messaging system interfaces 208, 210, 212, 214 may connect to the messaging system 202 using the assigned UUID and token, and may await further instructions from the messaging system 202. In some embodiments, the messaging system 202 may act as a compute server that controls the messaging system messaging system interfaces 208, 210, 212, 214. For example, messaging system 202 may activate and/or deactivate pins of the machine running the messaging system interface 214, request sensor data from the machine, and/or cause the messaging system interface 214 to perform other functions related to the machine. In some embodiments, one or more of the messaging system interfaces 208, 210, 212, 214 can be connected to a gateway (e.g., messaging system gateway 206 or a mobile gateway), and the gateway may act as a compute server that controls the messaging system interfaces 208, 210, 212, 214 in a similar manner as the messaging system 202. In some embodiments, the messaging system interfaces 208, 210, 212, 214 may each be a mobile operating system or application that is able to run on mobile device operating systems, such as iOS and Android™ operating systems.

In one example of using one or more messaging system interfaces, a computing device may be provided. The computing device may include a Raspberry Pi board, an Arduino board, a microcontroller, a minicomputer, or any other suitable computing device. The computing device may be built into or integrated with a first device to allow the first device to communicate with other devices. For example, the computing device includes a messaging system interface (or "universal interface") for enabling one or more sensors of the first device to communicate with one or more sensors of a second device by connecting the one or more sensors with a network server of the messaging system 202. The first device and the second device may be in different locations, such as different rooms of a building, cities, countries, or continents. The first device may include a solar panel located on a roof of a building, and the second device may include a dimmable light bulb located in a room of the building.

The proprietary protocol and native firmware of the first device and the proprietary protocol and native firmware of the second device may not allow the devices to exchange communications with each other or with the messaging system 202. The universal interface allows the first device to communicate with the messaging system 202 in order to exchange communications with the second device. The universal interface is configured to and may obtain sensor data from a sensor of the first device. For example, the universal interface may obtain sensor data from the solar panel indicating that it is getting dark outside of the building. The amount of sunlight being received may fall below a certain threshold level as measured by an amount of current being generated by the solar panel using the received sunlight. The universal interface may cause a transmitter of the first device to transmit the sensor data to a network server of the messaging system 202, which may include a cloud network. The universal interface thus allows the first device to transmit sensor data to the messaging system 202 even when the proprietary protocol or firmware of the first device does not allow the one or more sensors of the first device to communicate with other devices. In some embodiments, the universal interface may transmit the sensor data to a messaging system gateway on a LAN and/or a PAN with which the universal interface can communicate.

The universal interface may further receive a command from the messaging system 202. The command may be received when a sensor of the second device senses a condition. For example, the light may include a photodiode that can sense light. The photodiode may sense natural light, and in response may transmit a message to the messaging system 202 (e.g., using a universal interface installed on the dimmable light) to query whether the solar panel senses sunlight. In this example, the solar panel may have incorrectly determined that it was getting dark in response to the sun going behind a cloud. The command received by the universal interface may cause the sensor of the first device to perform a function. For example, the solar panel may check the amount of current being produced based on the current amount of sunlight being received. The first device may then send a command to the messaging system 202 with updated sensor data.

In some embodiments, the universal interface is configured to and may determine a first universally unique identifier assigned to the sensor of the first device, determine a second universally unique identifier assigned to a sensor of the second device, and cause the transmitter to transmit the first universally unique identifier and the second universally unique identifier with the sensor data to the network server. Accordingly, the network server of the messaging system 202 may determine to which device and sensor to transmit the message, and may determine the security access permissions of the first device sensor.

In another example, a universal messaging system interface installed on a device may allow multiple sensors within the device to interact in a way that the sensors were not designed to operate. For example, a device may include a thermostat. The thermostat may include a motion sensor that is designed to turn on a LED display when motion is detected. The thermostat may also include a controller that controls the temperature of an air conditioning system. The native proprietary protocol and firmware of the thermostat is not designed to allow the motion detector to be used except to send signals to turn on the LED display as motion is detected. For example, the native proprietary protocol and firmware of the thermostat may not allow the motion sensor and the controller to communicate with one another. The thermostat may be integrated with a computing device (e.g., a Raspberry Pi board, an Arduino board, a microcontroller, a minicomputer, or any other suitable computing device) that has a universal messaging system interface installed on it. The universal messaging system interface allows the sensors of the thermostat to communicate with the messaging system 202. For example, the motion sensor and the controller may be assigned separate UUIDs and tokens. The universal messaging system interface may stream motion data from the motion sensor to the messaging system 202. The messaging system 202 may perform one or more functions based on the motion data. For example, the messaging system 202 may include a program that sends a message to the controller anytime motion is detected by the motion sensor. The program may be created by a user of the thermostat using the designer graphical interface implemented by the platform network 110 or the design interface 120 described above. The program may be stored in the messaging system 202, and may access the motion data and convert motion sensor values to a command that is included in the message. The command may instruct the controller to turn the temperature of the air conditioning system to 72 degrees. Accordingly, sensors of the thermostat that are not designed to communicate with one another can exchange messages using the messaging system and the messaging system interface.

Figure 3:
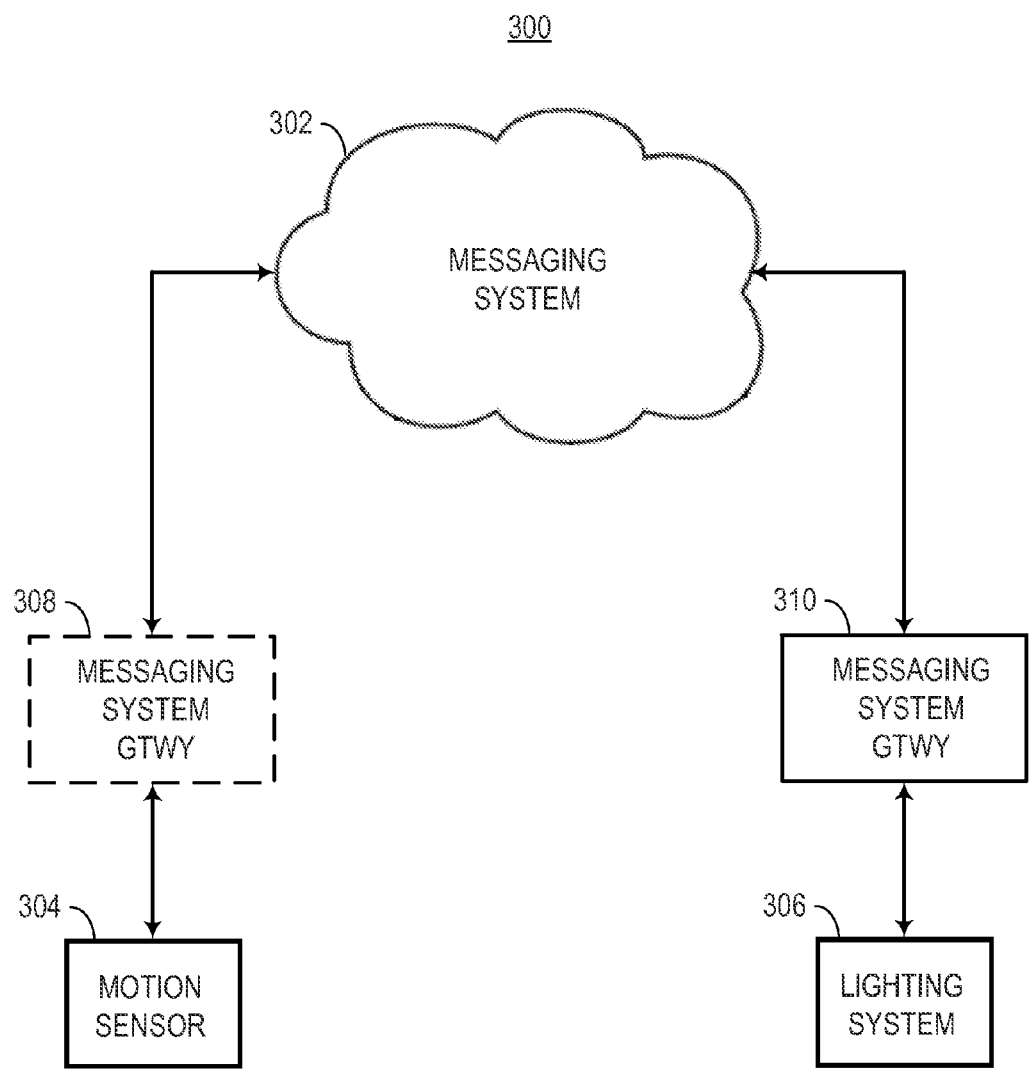
FIG. 3 is a system diagram illustrating an example of a system for utilizing one or more messaging system interfaces to communicate with a messaging system, according to some embodiments.

FIG. 3 illustrates another example of a system 300 that utilizes one or more messaging system interfaces to communicate with a messaging system 302. The system 300 includes a motion sensor 304. The system 300 further includes a lighting system 306. The lighting system 306 may include three lights. The native firmware of the motion sensor 304 and the native firmware of the lighting system 306 may not allow the motion sensor 304 and the lighting system 306 to exchange communications. The motion sensor 304 may include or be integrated with a computing device that is installed with a messaging system interface that allows the motion sensor 304 to communicate with the messaging system 302. The computing device may include a Raspberry Pi board, an Arduino board, a microcontroller, a minicomputer, or any other suitable computing device. The computing device with the installed messaging system interface may be integrated with the motion sensor 304. In some embodiments, the motion sensor 304 may communicate with the messaging system 302 via the messaging system gateway 308. However, the motion sensor 304 may communicate directly with the messaging system 302 using the messaging system interface. The messaging system gateway 308 is illustrated in FIG. 3 with dotted lines to indicate the optional nature of the messaging system gateway 308.

The messaging system interface allows the motion sensor 304 to stream motion data to the messaging system 302 (either directly or via the messaging system gateway 308). In some embodiments, a user of the lighting system 306 and motion sensor 304 may create a program in the messaging system 302 (e.g., using the designer graphical interface implemented by the platform network 110 or the design interface 120 described above) that accesses the streamed motion data and converts motion sensor values to different colors and/or patterns of the lighting system 302. For example, when motion is detected, the colors of the lights in the lighting system 302 should all be different colors (e.g., red, blue, and green). Otherwise, the lights in the lighting system 302 should all be the same color (e.g., white). The program may be mapped to the UUID of the motion sensor 304 and the UUID of the lighting system 306. As the motion data is streamed, the messaging system gateway 308 (e.g., using a plug-in as described above) and/or the messaging system 302 may convert the connection protocol and/or the application programming interface protocol of the motion sensor to the native protocols used by the messaging system 302, if needed. The messaging system 302 may implement the user's program based on the received motion data, and may output a message to the messaging system gateway 310 in accordance with the motion data. For example, when data is received indicating that motion is detected, the messaging system 302 may send a message to the messaging system gateway 310 with commands that cause the lights of the lighting system 306 to be turned red, blue, and green. The messaging system gateway 310 may include a plug-in that converts the generic message from the messaging system 302 to a proprietary message that a proprietary application programming interface of the lighting system 306 can interpret (e.g., a Philips Hue™ proprietary protocol, or the like). The messaging system gateway 310 may then output messages in the appropriate proprietary format to each of the lights of the lighting system 306 with the hue values according to red, blue, and green.

The messaging systems 102, 202, or 204 may also allow serially-connected devices that are located remote from one another to communicate. The serially-connected devices may not be configured to communicate directly with a messaging system, and thus may be required to serially connect to another device that can connect with the messaging system. For example, the serially-connected devices may not be equipped with a wireless transceiver or with a wired port that allows the devices to communicate with a network. In some examples, the messaging system 202 may allow a first serial device and/or serial interface to connect to the messaging system 202 and communicate with it from anywhere in the world via the universal application programming interface or any of the native protocols of the messaging system. A second serial device may also be connected to the messaging system 202 (via a device that can directly connect to the messaging system 202). The messaging system 202 may bind sessions of the first and second serially-connected devices together, in effect creating a virtual serial cable connection that extends to the two remote locations of the first and second serially-connected devices. Each of the serially-connected devices may be assigned a UUID and token by the messaging system 202, similar to that described above. The messaging system 202 may convert the serial input communication from the first serially-connected device to a communication in the native protocol of the messaging system, and may process the input using the universal application programming interface. The messaging system 202 may then convert the communication back to serial on the output before sending the communication to the second serially-connected device. Accordingly, a first serially-connected device can communicate with another serially-connected device over the cloud network of the messaging system 202 by sending serial communications to the messaging system 202.

In some embodiments, the virtual serial cable created by the messaging system 202 can connect serial devices or emulated serial devices in various configurations, such as one-to-one, one-to-many, and many-to-many. In the example provided above, one serially-connected device may be connected to another serially-connected device. In another example, one serially-connected device may be connected to more than one other serially-connected device. In yet another example, multiple serially-connected devices may be connected to multiple other serially-connected devices. A many-to-many serial device set of connections may operate as a wide area network of serially connected devices.

In one example, a network server for binding remote serially-connected devices may be provided. The network server may be part of the messaging system 102, 202, or 204. The network server includes one or more data processors and a receiver. The receiver is configured to and may receive a serial communication from a first serially-connected device located in a first location. The first serially-connected device is assigned a first universally unique identifier, and the serial communication includes a second universally unique identifier assigned to a second serially-connected device located in a second location. In some embodiments, the first serially-connected device and the second serially-connected device are not configured to communicate with the network server. The first serially-connected device is serially connected to a first device that enables communication with the network server, and the second serially-connected device is serially connected to a second device that enables communication with the network server.

The network server further includes a non-transitory computer-readable storage medium containing instructions which when executed on the one or more data processors, cause the one or more processors to perform operations. The network server may obtain the second universally unique identifier and determine that the second universally unique identifier is assigned to the second serially-connected device. The network server may create a virtual serial connection between the first serially-connected device and the second serially-connected device. The virtual serial connection is established with the second serially-connected device based on the second universally unique identifier being assigned to the second serially-connected device. The network server further includes a transmitter that is configured to and may transmit the serial communication to the second serially-connected device located in the second location. In some embodiments, the transmitter may also transmit the first universally unique identifier along with the serial communication to the second serially-connected device. Once received by the second serially-connected device, the serial communication causes the second serially-connected device to perform an operation.

In some embodiments, creating the virtual serial connection includes binding communications of the first and second serially-connected devices to the other of the first and second serially-connected devices such that all communications communicated from the first serially-connected device are transmitted to the second serially-connected device, and such that all communications communicated from the second serially-connected device are transmitted to the first serially-connected device, until the virtual serial connection is released. For example, the connection may be released once one or both of the first or second serially-connected devices are taken offline and the connection with the messaging system is released.

Figure 4:
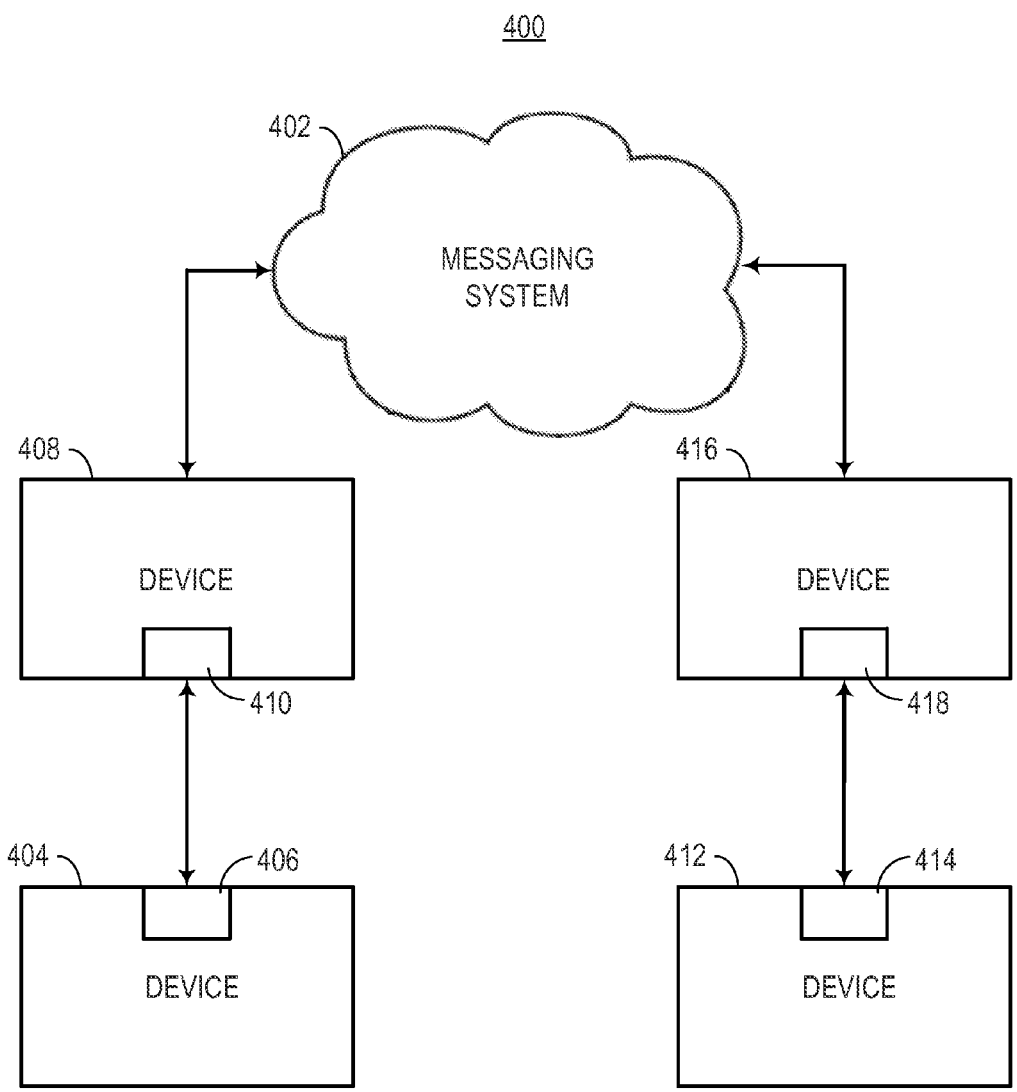
FIG. 4 is a system diagram illustrating an example of a system for creating a virtual serial cable connection, according to some embodiments.

FIG. 4 illustrates an example of a system 400 for creating a virtual serial cable connection. The system 400 includes a serial device 404 that includes a serial interface 406 and a device 408 that includes serial interface 410. The serial device 404 may include a motion detector, and the device 408 may include a personal computer, such as a desktop computer, a messaging system gateway, or any other appropriate device. The serial device 404 and the device 408 may be serially connected to one another via a serial connection between serial interfaces 406 and 410. For example, a serial cable may be connected to each of the serial interfaces 406 and 410. The system 400 further includes a serial device 412 that includes a serial interface 414 and a device 416 that includes serial interface 418. The serial device 412 may include a music player that does not include any network access capabilities, and the device 416 may include a personal computer, such as a lap top computer or a tablet, a messaging system gateway, or any other appropriate device. The serial device 412 and the device 416 may be serially connected via a serial connection between serial interfaces 414 and 418. For example, a serial cable may be connected to the serial interfaces 414 and 418. The serial devices 404 and 412 may be connected to the messaging system 402 via the devices 408 and 416. The messaging system 402 may create a virtual serial cable connection between the serially-connected devices 404 and 412 by binding together the communication sessions of the serially-connected devices 404 and 412. The messaging system 402 my assign UUIDs and tokens to the serially-connected devices 404 and 412. The communication sessions may be bound using the assigned UUIDs. For example, the messaging system 402 may map the UUID of the serial device 404 to the UUID of the serial device 412 so that all communications communicated from the serial device 404 are transmitted to the serial device 412, and so that all communications communicated from the serial device 412 are transmitted to the serial device 404.

The serial device 404 may detect motion, and may transmit a serial communication including motion data over the serial connection to the device 408. The device 408 may relay the serial communication to the messaging system 402. The messaging system 402 may convert the serial communication from the serial device 404 to a communication in the native protocol of the messaging system. The messaging system 402 may process the input using the universal application programming interface in order to determine what output to send to the serial device 412. For example, the messaging system 402 may store a program (e.g., created by a user using the designer graphical interface implemented by the platform network 110 or the design interface 120 described above) that generates an output communication that causes the serial device 412 to play music whenever motion data is received. The messaging system 402 may then convert the output communication back to serial before sending the output communication to the serial device 412 via the device 416.

The communication sessions of the serial devices 404 and 412 may be bound to one another until the virtual serial connection is released. For example, the connection may be released once one or both of the serial devices 404 and 412 are taken offline and the connection with the messaging system 402 is released.

FIG. 5 illustrates an embodiment of a process 500 of translating between different connection protocols. In some aspects, the process 500 may be performed by a computing device, such as one or more network servers of the messaging systems 102, 202, 204, 302, or 402 shown in FIGS. 1-4. While specific examples may be given of a network server performing the process 500, one of ordinary skill in the art will appreciate that other devices may perform the process 500.

Process 500 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 502, the process 500 includes receiving, by a computing device, a communication from a first IoT device, wherein the first IoT device is communicatively connected to the computing device using a first connection protocol, and wherein the communication is received using the first connection protocol. In some embodiments, the computing device may be a network server of a messaging system (e.g., messaging system 102, 202, 204, 302, or 402). For example, the first IoT device may transmit a communication destined for a second IoT device. The communication may be received by the computing device directly from the first IoT device over a wide area network, or may be received via a messaging system gateway (e.g., messaging system gateway 114 or 206) or a mobile gateway (e.g., mobile gateway 118) via a local area network and/or a personal area network. In some embodiments, the first IoT device may include a messaging system interface (e.g., messaging system interface 116, 208, 210, 212, or 214). The first connection protocol may be a connection protocol that is native to the computing device.

At 504, the process 500 includes determining a second IoT device to which the communication is intended to be transmitted. At 506, the process 500 includes determining a second connection protocol used by the second IoT device. For example, the first IoT device may be assigned a first universally unique identifier (UUID), and the second IoT device may be assigned a second UUID. The received communication may include the second UUID (e.g., in a field of a communication packet), and the second IoT device and the second connection protocol used by the second IoT device may be determined based on the second UUID. For example, the computing device may refer to a registry store (e.g., in a device directory of messaging system 202) that is associated with the second UUID in order to determine the connection protocol used by the second IoT device. In some embodiments, the first connection protocol and the second connection protocol include machine-to-machine connection protocols. For example, the first connection protocol may be a MQTT connection protocol and the second connection protocol may be a HTTP connection protocol.

At 508, the process 500 includes translating the communication to the second connection protocol, wherein the first connection protocol is different than the second connection protocol. The second connection protocol corresponds to the protocol with which the second IoT device is connected to the computing device. In some embodiments, the first IoT device may not be configured to communicate using the second connection protocol, and the second IoT device may not be configured to communicate using the first connection protocol.

At 510, the process 500 includes transmitting the communication to the second IoT device, wherein the second IoT device is communicatively connected to the computing device using the second connection protocol, and wherein the communication is transmitted using the second connection protocol.

In some embodiments, the process 500 may include receiving a response to the communication from the second IoT device, wherein the response is received using the second connection protocol. The process 500 may include translating the response to the first connection protocol and transmitting the response to the first IoT device, wherein the response is transmitted using the first connection protocol.

In some embodiments, the process 500 may include receiving a second communication from a third-party messaging account and transmitting the second communication to the second IoT device. The second communication received from the third-party messaging account controls a function of the second IoT device. For example, the third-party messaging account may be an account of a third-party messaging service, such as Facebook™, Twitter™, LinkedIn™, SMS, or any other messaging service that allows a user of a device to send and receive messages using a registered account. In some embodiments, the second communication includes a message and a tag. The tag identifies a destination program of the second IoT device, such as an application or program that enables a machine or device to send messages using the third-party messaging accounts. For example, the tag may identify an identifier of the application or program. Upon being received by the application or program of the second device, the destination application or program may be opened and the tagged data may be entered into the application or program to activate the indicated function.

Figure 6:
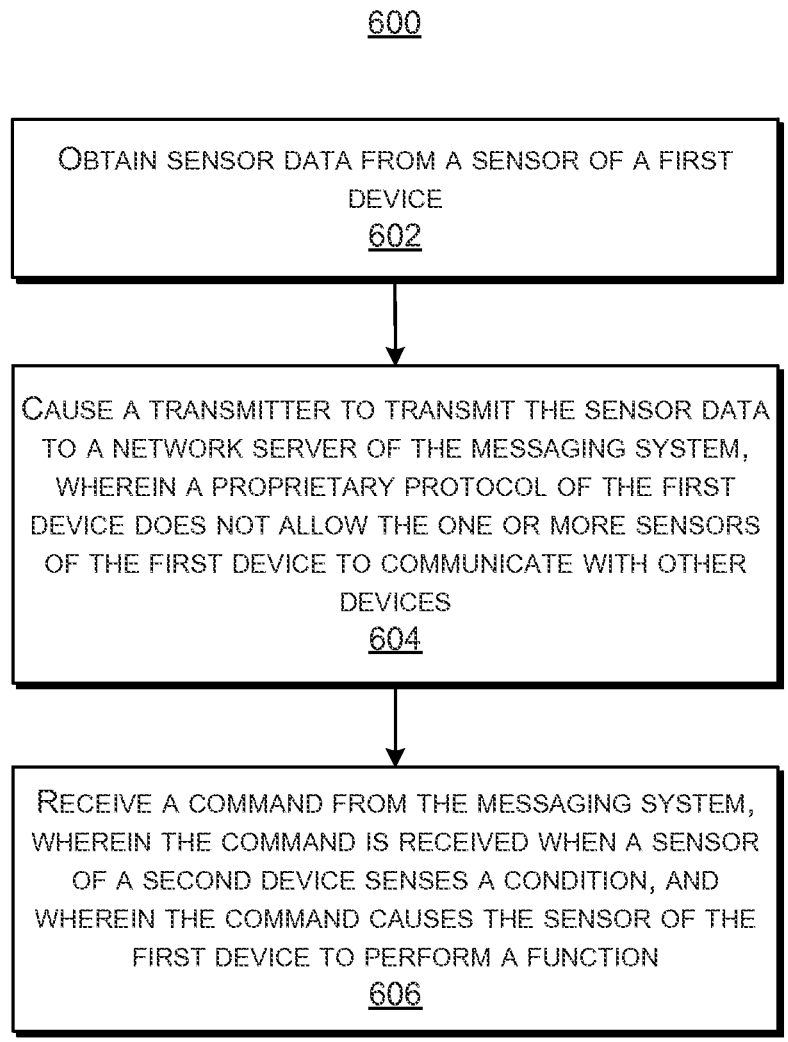
FIG. 6 is a flowchart illustrating an embodiment of a process of exchanging sensor data using one or more messaging system interfaces, according to some embodiments.

FIG. 6 illustrates an embodiment of a process 600 of exchanging sensor data using one or more messaging system interfaces. In some aspects, the process 600 may be performed by a computing device, such as microcontroller or other electronic device with a messaging system interface 116, 208, 210, 212, or 214 shown in FIGS. 1-2. One of ordinary skill in the art will appreciate that other devices may perform the process 600.

Process 600 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 602, the process 600 includes obtaining, by a computing device, sensor data from a sensor of a first device. The computing device may include a Raspberry Pi board, an Arduino board, a microcontroller, a minicomputer, or any other suitable computing device. The computing device may be built into or integrated with a first device to allow the first device to communicate with other devices. For example, the computing device includes a messaging system interface (or "universal interface") for enabling one or more sensors of the first device to communicate with one or more sensors of a second device by connecting the one or more sensors with a network server of a messaging system (e.g., messaging system 102, 202, 204, 302, or 402). The first device and the second device may be in different locations, such as different rooms of a building, different cities, different countries, or different continents. In one example, the first device may include a solar panel located on a roof of a building, and the second device may include a dimmable light bulb located in a room of the building.

At 604, the process 600 includes causing a transmitter to transmit the sensor data to a network server of the messaging system, wherein a proprietary protocol of the first device does not allow the one or more sensors of the first device to communicate with other devices. For example, the proprietary protocol and native firmware of the first device and the proprietary protocol and native firmware of a second device may not allow the devices to exchange communications with each other or with the messaging system. The universal interface allows the first device to communicate with the messaging system in order to exchange communications with the second device. The universal interface is configured to and may obtain sensor data from a sensor of the first device. Using the example above, the universal interface may obtain sensor data from the solar panel indicating that it is getting dark outside of the building. The amount of sunlight being received may fall below a certain threshold level as measured by an amount of current being generated by the solar panel using the received sunlight. The universal interface may instruct the transmitter to transmit the sensor data to the messaging system. Accordingly, the universal interface thus allows the first device to transmit sensor data to the messaging system even when the proprietary protocol or firmware of the first device does not allow the one or more sensors of the first device to communicate with other devices. In some embodiments, the sensor data is transmitted to a cloud network that includes the network server. In some embodiments, the sensor data is transmitted to a messaging system gateway connected to a same local area network as the computing device. In some embodiments, the sensor data is transmitted to a mobile gateway via a personal area network.

At 606, the process 600 includes receiving a command from the messaging system, wherein the command is received when a sensor of the second device senses a condition, and wherein the command causes the sensor of the first device to perform a function. For example, the dimmable light bulb may include a photodiode that can sense light. The photodiode may sense natural light, and in response may transmit a message to the messaging system (e.g., using a universal interface installed on the dimmable light) to query whether the solar panel senses sunlight. Clouds covering the sun may have caused the amount of sunlight to fall below the threshold, causing the solar panel to send the sensor data indicating darkness. In response to receiving the message transmitted by the light bulb, the solar panel may check the amount of current being produced based on the amount of sunlight being received. The first device may then send a command to the messaging system with updated sensor data based on the current measurement.

In some embodiments, the process 600 includes determining a first universally unique identifier assigned to the sensor of the first device, determining a second universally unique identifier assigned to a sensor of the second device, and causing the transmitter to transmit the first universally unique identifier and the second universally unique identifier with the sensor data to the network server. Accordingly, the network server of the messaging system may determine to which device and sensor to transmit the message, and may determine the security access permissions of the first device sensor.

FIG. 7 illustrates an embodiment of a process 700 of creating a virtual serial cable connection. In some aspects, the process 700 may be performed by a computing device, such as one or more network servers of the messaging systems 102, 202, 204, 302, or 402 shown in FIGS. 1-4. While specific examples may be given of a network server performing the process 700, one of ordinary skill in the art will appreciate that other devices may perform the process 700.

Process 700 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 702, the process 700 includes receiving a serial communication from a first serially-connected device located in a first location, wherein the first serially-connected device is assigned a first universally unique identifier, and wherein the serial communication includes a second universally unique identifier assigned to a second serially-connected device located in a second location. In some embodiments, the first serially-connected device and the second serially-connected device are not configured to communicate with the network server. In some embodiments, the first serially-connected device is serially connected to a first device that enables communication with the network server, and the second serially-connected device is serially connected to a second device that enables communication with the network server.

At 704, the process 700 includes obtaining the second universally unique identifier. At 706, the process 700 includes determining that the second universally unique identifier is assigned to the second serially-connected device. At 708, the process 700 includes creating a virtual serial connection between the first serially-connected device and the second serially-connected device, wherein the virtual serial connection is established with the second serially-connected device based on the second universally unique identifier being assigned to the second serially-connected device. At 710, the process 700 includes transmitting the serial communication to the second serially-connected device located in the second location, wherein the serial communication causes the second serially-connected device to perform an operation. In some embodiments, the first universally unique identifier may be transmitted along with the serial communication to the second serially-connected device.

In some embodiments, the process 700 further includes converting the received serial communication to a communication in a native protocol of the network server and processing the communication using an application programming interface. In some embodiments, the process 700 further includes converting the communication back to a serial format before transmitting the communication to the second serially-connected device.

In some embodiments, creating the virtual serial connection includes binding communications of the first and second serially-connected devices to the other of the first and second serially-connected devices such that all communications communicated from the first serially-connected device are transmitted to the second serially-connected device, and such that all communications communicated from the second serially-connected device are transmitted to the first serially-connected device, until the virtual serial connection is released. For example, the connection may be released once one or both of the first or second serially-connected devices are taken offline and the connection with the messaging system is released.

Figure 8:
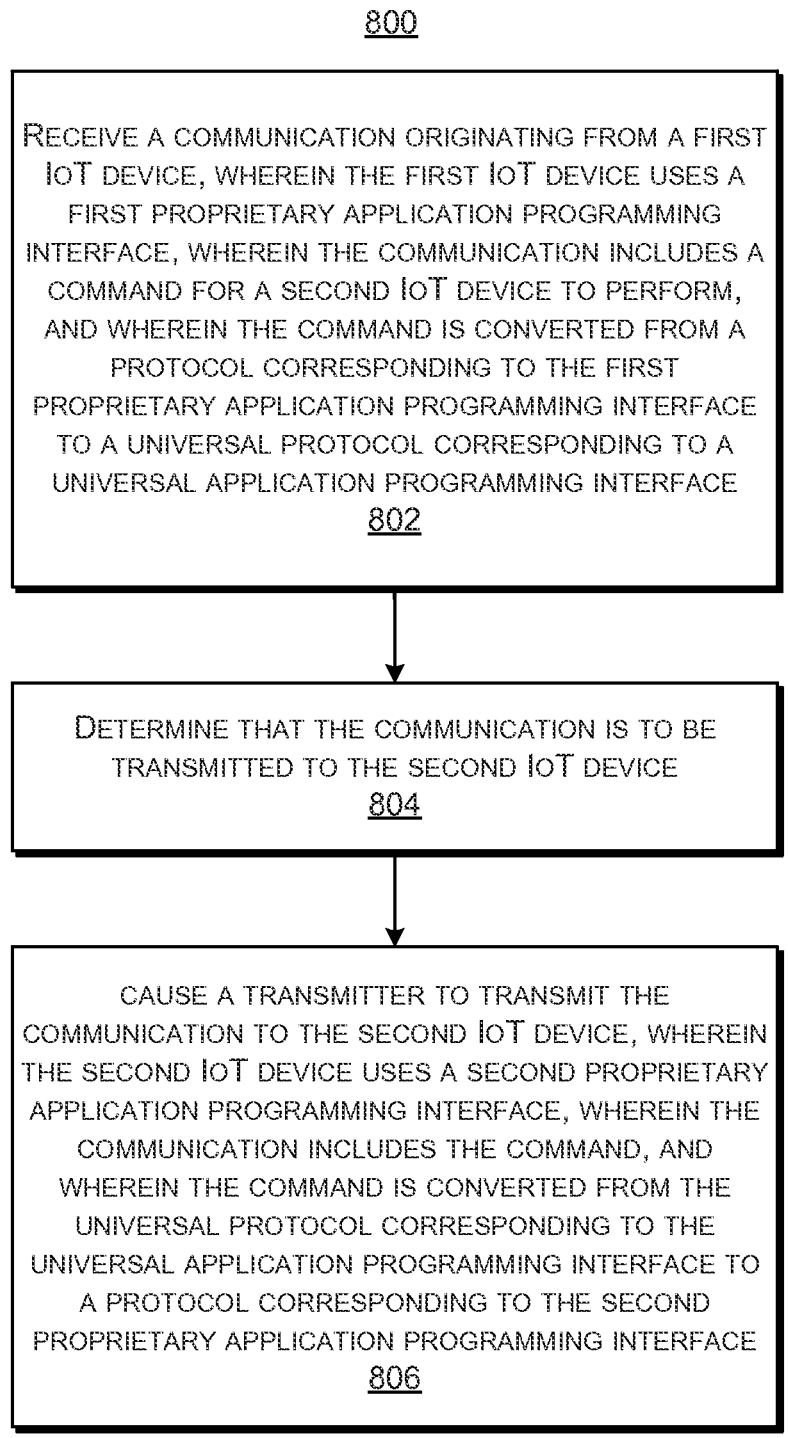
FIG. 8 is a flowchart illustrating an embodiment of a process of using a universal application programming interface to process communications from different devices, according to some embodiments.

FIG. 8 illustrates an embodiment of a process 800 of using a universal application programming interface to process communications from different devices. In some aspects, the process 800 may be performed by a computing device, such as one or more network servers of the messaging systems 102, 202, 204, 302, or 402 shown in FIGS. 1-4. While specific examples may be given of a network server performing the process 800, one of ordinary skill in the art will appreciate that other devices may perform the process 800.

Process 800 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 802, the process 800 includes receiving, using a computing device, a communication originating from a first IoT device, wherein the first IoT device uses a first proprietary application programming interface, wherein the communication includes a command for a second IoT device to perform, and wherein the command is converted from a protocol corresponding to the first proprietary application programming interface to a universal protocol corresponding to a universal application programming interface. The computing device may include the universal application programming interface. In some embodiments, the computing device is included in a cloud network. For example, the computing device may include one or more network servers of a messaging system (e.g., messaging system 102, 202, 204, 302, or 402). In some embodiments, the computing device may convert the command to a format that is understood by the universal application programming interface, as described above. In some embodiments, a plug-in of a messaging system gateway (e.g., messaging system gateway 114 or 206) or a mobile gateway (e.g., mobile gateway 118) may convert the command to a format that is understood by the universal application programming interface, as described above.

At 804, the process 800 includes determining that the communication is to be transmitted to the second IoT device. For example, the first IoT device may be assigned a first universally unique identifier, and the second IoT device may be assigned a second universally unique identifier. The received communication may include the second universally unique identifier (e.g., in a field of a communication packet). The identity of the second IoT device may be determined based on the second universally unique identifier.

At 806, the process 800 includes causing a transmitter to transmit the communication to the second IoT device, wherein the second IoT device uses a second proprietary application programming interface, wherein the communication includes the command, and wherein the command is converted from the universal protocol corresponding to the universal application programming interface to a protocol corresponding to the second proprietary application programming interface. In some embodiments, the computing device may convert the command to a format that is usable by the second proprietary application programming interface, as described above. In some embodiments, a plug-in of a messaging system gateway (e.g., messaging system gateway 114 or 206) or a mobile gateway (e.g., mobile gateway 118) may convert the command to a format that is usable by the second proprietary application programming interface, as described above.

In some embodiments, the process 800 includes receiving a second communication from a third-party messaging account, and transmitting the second communication to the second IoT device, wherein the second communication controls a function of the second IoT device. For example, the third-party messaging account may be an account of a third-party messaging service, such as Facebook™, Twitter™, LinkedIn™, SMS, or any other messaging service that allows a user of a device to send and receive messages using a registered account. In some embodiments, the second communication includes a message and a tag. The tag identifies a destination program of the second IoT device, such as an application or program that enables a machine or device to send messages using the third-party messaging accounts. For example, the tag may identify an identifier of the application or program. Upon being received by the application or program of the second IoT device, the destination application or program may be opened and the tagged data may be entered into the application or program to activate the indicated function.

FIG. 9 illustrates an embodiment of a process 900 of using one or more plug-ins to process communications from different devices. In some aspects, the process 900 may be performed by a computing device, such as a messaging system gateway 114, 206, 308, or 310 shown in FIGS. 1-3 or a mobile gateway 118 shown in FIG. 1. One of ordinary skill in the art will appreciate that other devices may perform the process 900.

Process 900 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 902, the process 900 includes receiving, using a computing device, a communication from a first proprietary application programming interface of a first IoT device, wherein the communication includes a command for a second IoT device to perform, and wherein the second IoT device uses a second proprietary application programming interface. For example, the computing device may be provided for communicating with a universal application programming interface of a messaging system (e.g., messaging system 102, 202, 204, 302, or 402). In some embodiments, the computing device may be included in a messaging system gateway, and may execute one or more plug-ins. In one example, the first IoT device includes a smoke alarm and the second IoT device includes a lighting system controller connected to one or more lights. The first and second IoT devices may be connected to the computing device via a local area network, a personal area network, or a combination of a local area network and a personal area network. The command may include a message indicating that the smoke alarm has detected smoke, and that the lighting system controller is to turn on the one or more lights.

At 904, the process 900 includes converting the command from a protocol corresponding to the first proprietary application programming interface to a universal protocol corresponding to the universal application programming interface. At 906, the process 900 includes causing a transmitter to transmit the communication including the converted command to the universal application programming interface. In some embodiments, the messaging system that includes the universal application programming interface is part of a cloud network, and the communication is transmitted to the cloud network. The universal application programming interface may process the command (e.g., determine permissions of the first IoT device, and any other appropriate processing), determine the identity of the second IoT device, and route the command to the appropriate networks or devices so that it can reach the second IoT device. The command may then be received by the second IoT device or a messaging system gateway connected to the second IoT device. A plug-in of the messaging system gateway may then convert the command to a command that can be carried out by a proprietary application programming interface of the second IoT device.

In some embodiments, the process 900 includes receiving a second communication from the universal application programming interface, wherein the second communication includes a command for a third IoT device to perform, and wherein the third IoT device uses a third proprietary application programming interface. The third device may include another device connected to the computing device via the local area network, the personal area network, or a combination of the local area network and the personal area network. The process 900 may further include converting the command of the second communication from the universal protocol corresponding to the universal application programming interface to a protocol corresponding to the third proprietary application programming interface used by the third IoT device. The process 900 may further include causing the transmitter to transmit the second communication including the converted command to the third IoT device.

In some embodiments, the process 900 includes determining a sub-device that is mapped to the third IoT device, wherein converting the command of the second communication includes routing the second communication to the sub-device mapped to the third IoT device. The process 900 may further determine a plug-in that applies to the sub-device. As described above, the sub-device is mapped to a particular plug-in and can be used to identify the plug-in to use to convert the command to the proprietary application programming interface.

In some embodiments, the process 900 includes receiving a second communication from the universal application programming interface, wherein the second communication includes a message from a third-party messaging account, and wherein the second communication controls a function of the second IoT device. For example, the third-party messaging account may be an account of a third-party messaging service, such as Facebook™, Twitter™, LinkedIn™, SMS, or any other messaging service that allows a user of a device to send and receive messages using a registered account. In some embodiments, the second communication includes a message and a tag. The tag identifies a destination program of the second device, such as an application or program that enables a machine or device to send messages using the third-party messaging accounts. For example, the tag may identify an identifier of the application or program. Upon being received by the application or program of the second device, the destination application or program may be opened and the tagged data may be entered into the application or program to activate the indicated function.

Figure 10:
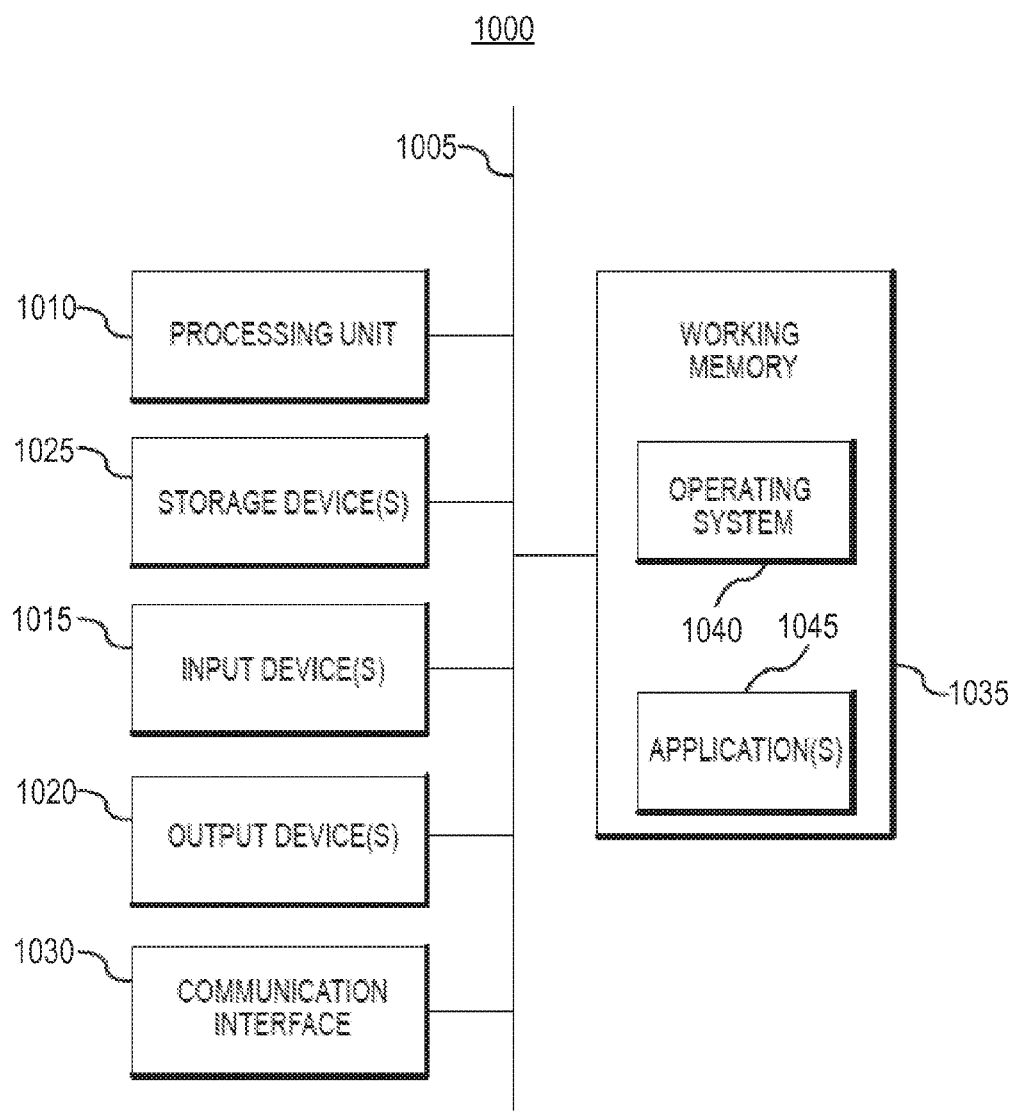
FIG. 10 is a block diagram of an example of a computing device or system, according to some embodiments.

A computer system as illustrated in FIG. 10 may be incorporated as part of the previously described computing devices and systems. For example, computer system 1000 can represent one or more of the components of the messaging system 102, the platform network 108, the messaging system gateway 114, the messaging system interface 116, or the mobile gateway 118 of FIG. 1, the messaging system 202, messaging system 204, messaging system interfaces 208, 210, 212, 214, or messaging system gateway 206 of FIG. 2, or any of the IoT devices, third-party messaging accounts, and/or computing devices and systems described herein. FIG. 10 provides a schematic illustration of one embodiment of a computer system 1000 that can perform the methods provided by various other embodiments, as described herein, and/or can function as the host computer system, a remote kiosk/terminal, a point-of-sale device, a mobile device, and/or a computer system. FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include a processing unit 1010, including without limitation one or more general-purpose processors and/or one or more special-purpose processors (such as digital signal processing chips, graphics acceleration processors, and/or the like); one or more input devices 1015, which can include without limitation a mouse, a keyboard, a touchscreen, a global positioning system (GPS) receiver, a motion sensor, a camera, and/or the like; and one or more output devices 1020, which can include without limitation a display device, a speaker, a printer, and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communication interface 1030, which can include without limitation a modem, a network card (wireless or wired), an infrared communication device, a wireless communication device and/or chipset (such as a Bluetooth™ device, an 802.11 device, a WiFi device, a WiMax device, an NFC device, cellular communication facilities, etc.), and/or similar communication interfaces. The communication interface 1030 may permit data to be exchanged with a network (such as the network described below, to name one example), other computer systems, and/or any other devices described herein. In many embodiments, the computer system 1000 will further comprise a non-transitory working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, an journey planning and pricing engine configured to provide some or all of the features described herein relating to the journey planning and/or pricing can comprise hardware and/or software that is specialized (e.g., an application-specific integrated circuit (ASIC), a software method, etc.) or generic (e.g., processing unit 1010, applications 1045, etc.) Further, connection to other computing devices such as network input/output devices may be employed.

Some embodiments may employ a computer system (such as the computer system 1000) to perform methods in accordance with the disclosure. For example, some or all of the procedures of the described methods may be performed by the computer system 1000 in response to processing unit 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processing unit 1010 to perform one or more procedures of the methods described herein.

In an embodiment implemented using the computer system 1000, various computer-readable storage media might be involved in providing instructions/code to processing unit 1010 for execution and/or might be used to store and/or carry such instructions/code (e.g., as signals). In many implementations, a computer-readable storage medium is a physical and/or tangible storage medium. Such a medium may take many forms, including but not limited to, non-volatile media, volatile media, and transmission media. Non-volatile media include, for example, optical and/or magnetic disks, such as the storage device(s) 1025. Volatile media include, without limitation, dynamic memory, such as the working memory 1035. Transmission media include, without limitation, coaxial cables, copper wire and fiber optics, including the wires that comprise the bus 1005, as well as the various components of the communication interface 1030 (and/or the media by which the communication interface 1030 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 1030 (and/or components thereof) generally will receive the signals, and the bus 1005 then might carry the signals (and/or the data, instructions, etc. carried by the signals) to the working memory 1035, from which the processor(s) 1005 retrieves and executes the instructions. The instructions received by the working memory 1035 may optionally be stored on a non-transitory storage device 1025 either before or after execution by the processing unit 1010.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing description, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A network server for binding communication sessions of remote serially-connected devices, comprising:
   one or more data processors;
   a receiver for receiving one or more serial communications associated with a first serially-connected device located in a first location and a second serially-connected device located in a second location, wherein the first serially-connected device and the second serially-connected device are not configured to directly communicate with the network server, wherein the first serially-connected device is assigned a first universally unique identifier and is serially connected to a first device that enables communication with the network server, wherein the second serially-connected device is assigned a second universally unique identifier is serially connected to a second device that enables communication with the network server, and wherein a received serial communication includes the second universally unique identifier;
   a non-transitory computer-readable storage medium containing instructions which when executed on the one or more data processors, cause the one or more data processors to perform operations including:
      obtaining the second universally unique identifier;
      determining that the second universally unique identifier is assigned to the second serially-connected device; and
      creating a virtual serial connection between the first serially-connected device and the second serially-connected device, wherein the virtual serial connection is established with the second serially-connected device based on the second universally unique identifier being assigned to the second serially-connected device, wherein the virtual serial connection is created by binding a communication session of the first serially-connected device and the second serially-connected device such that serial communications from the first serially-connected device are configured to be transmitted to the second serially-connected device and serial communications from the second serially-connected device are configured to be transmitted to the first serially-connected device, and wherein the virtual serial connection is maintained until the first serially-connected device or the second serially-connected device is taken offline; and
   a transmitter for transmitting the serial communication to the second serially-connected device located in the second location, wherein the serial communication causes the second serially-connected device to perform an operation.

2. The network server of claim 1, wherein the non-transitory computer-readable storage medium contains instructions which when executed on the one or more data processors, cause the one or more data processors to perform operations including:
   converting the received serial communication to a communication in a native protocol of the network server;
   processing the communication using an application programming interface; and
   converting the communication back to a serial format before transmitting the communication to the second serially-connected device.

3. The network server of claim 1, wherein when the virtual serial connection is created between the first serially-connected device and the second serially-connected device, communications communicated from the first serially-connected device are automatically transmitted to the second serially-connected device without user input.

4. The network server of claim 1, wherein the non-transitory computer-readable storage medium contains instructions which when executed on the one or more data processors, cause the one or more data processors to perform operations including:
   creating virtual serial connections between the first serially-connected device and multiple other serially-connected devices.

5. The network server of claim 1, wherein the non-transitory computer-readable storage medium contains instructions which when executed on the one or more data processors, cause the one or more data processors to perform operations including:
   creating virtual serial connections between a first plurality of serially-connected devices and a second plurality of serially-connected devices.

6. A computer-implemented method of binding communication sessions of remote serially-connected devices, comprising:
   receiving, by a computing device, one or more serial communications associated with a first serially-connected device located in a first location and a second serially-connected device located in a second location, wherein the first serially-connected device and the second serially-connected device are not configured to directly communicate with a network server, wherein the first serially-connected device is assigned a first universally unique identifier and is serially connected to a first device that enables communication with the network server, wherein the second serially-connected device is assigned a second universally unique identifier is serially connected to a second device that enables communication with the network server, and wherein a received serial communication includes the second universally unique identifier;
   obtaining the second universally unique identifier;
   determining that the second universally unique identifier is assigned to the second serially-connected device;
   creating a virtual serial connection between the first serially-connected device and the second serially-connected device, wherein the virtual serial connection is established with the second serially-connected device based on the second universally unique identifier being assigned to the second serially-connected device, wherein the virtual serial connection is created by binding a communication session of the first serially-connected device and the second serially-connected device such that serial communications from the first serially-connected device are configured to be transmitted to the second serially-connected device and serial communications from the second serially-connected device are configured to be transmitted to the first serially-connected device, and wherein the virtual serial connection is maintained until the first serially-connected device or the second serially-connected device is taken offline; and transmitting the serial communication to the second serially-connected device located in the second location, wherein the serial communication causes the second serially-connected device to perform an operation.

7. The method of claim 6, further comprising:
converting the received serial communication to a communication in a native protocol of the network server;
processing the communication using an application programming interface; and
converting the communication back to a serial format before transmitting the communication to the second serially-connected device.

8. The method of claim 6, wherein when the virtual serial connection is created between the first serially-connected device and the second serially-connected device, communications communicated from the first serially-connected device are automatically transmitted to the second serially-connected device without user input.

9. The method of claim 6, further comprising:
creating virtual serial connections between the first serially-connected device and multiple other serially-connected devices.

10. The method of claim 6, further comprising:
creating virtual serial connections between a first plurality of serially-connected devices and a second plurality of serially-connected devices.

11. A computer-program product tangibly embodied in a non-transitory machine-readable storage medium of a computing device, including instructions configured to cause one or more data processors to:

receive one or more serial communications associated with a first serially-connected device located in a first location and a second serially-connected device located in a second location, wherein the first serially-connected device and the second serially-connected device are not configured to directly communicate with a network server, wherein the first serially-connected device is assigned a first universally unique identifier and is serially connected to a first device that enables communication with the network server, wherein the second serially-connected device is assigned a second universally unique identifier is serially connected to a second device that enables communication with the network server, and wherein a received serial communication includes the second universally unique identifier;

obtain the second universally unique identifier;

determine that the second universally unique identifier is assigned to the second serially-connected device;

create a virtual serial connection between the first serially-connected device and the second serially-connected device, wherein the virtual serial connection is established with the second serially-connected device based on the second universally unique identifier being assigned to the second serially-connected device, wherein the virtual serial connection is created by binding a communication session of the first serially-connected device and the second serially-connected device such that serial communications from the first serially-connected device are configured to be transmitted to the second serially-connected device and serial communications from the second serially-connected device are configured to be transmitted to the first serially-connected device, and wherein the virtual serial connection is maintained until the first serially-connected device or the second serially-connected device is taken offline; and transmit the serial communication to the second serially-connected device located in the second location, wherein the serial communication causes the second serially-connected device to perform an operation.

12. The computer-program product of claim 11, further comprising instructions configured to cause the one or more data processors to:

convert the received serial communication to a communication in a native protocol of the network server;

process the communication using an application programming interface; and convert the communication back to a serial format before transmitting the communication to the second serially-connected device.

13. The computer-program product of claim 11, wherein when the virtual serial connection is created between the first serially-connected device and the second serially-connected device, communications communicated from the first serially-connected device are automatically transmitted to the second serially-connected device without user input.

14. The computer-program product of claim 11, further comprising instructions configured to cause the one or more data processors to:

create virtual serial connections between the first serially-connected device and multiple other serially-connected devices.

* * * * *